United States Patent
Shigeyoshi

(10) Patent No.: US 9,623,507 B2
(45) Date of Patent: Apr. 18, 2017

(54) TIP-BASE METAL DISTANCE CONTROL METHOD FOR ARC WELDING SYSTEM, AND ARC WELDING SYSTEM

(75) Inventor: Masayuki Shigeyoshi, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 1596 days.

(21) Appl. No.: 12/984,077

(22) Filed: Jan. 4, 2011

(65) Prior Publication Data

US 2011/0198331 A1 Aug. 18, 2011

(30) Foreign Application Priority Data

Feb. 18, 2010 (JP) ................................ 2010-033424

(51) Int. Cl.
*B23K 9/12* (2006.01)
*B23K 9/095* (2006.01)
*B23K 9/127* (2006.01)
*B23K 9/173* (2006.01)

(52) U.S. Cl.
CPC ............ *B23K 9/126* (2013.01); *B23K 9/0956* (2013.01); *B23K 9/1278* (2013.01); *B23K 9/173* (2013.01); *B23K 9/1735* (2013.01)

(58) Field of Classification Search
CPC .... B23K 9/0956; B23K 9/126; B23K 9/1278; B23K 9/173; B23K 9/1735
USPC ............ 219/124.33, 124.34, 130.32, 130.33, 219/130.21
See application file for complete search history.

(56) References Cited

U.S. PATENT DOCUMENTS 4,417,126 A * 11/1983 Kasahara et al. ........ 219/124.22
4,485,293 A * 11/1984 Tabata et al. ............ 219/130.31
4,785,155 A * 11/1988 Kishi et al. .............. 219/125.12
4,920,248 A * 4/1990 Toyoda et al. ........... 219/124.34
6,177,650 B1 * 1/2001 Watanabe et al. ......... 219/130.5

(Continued)

FOREIGN PATENT DOCUMENTS

JP 57-168772 10/1982
JP 61-238471 10/1986

(Continued)

OTHER PUBLICATIONS

Combined Chinese Office Action and Search Report Issued Nov. 27, 2012 in Patent Application No. 201110038221.4 (with English translation and English translation of Categories of Cited Documents).

(Continued)

*Primary Examiner* — David Angwin
*Assistant Examiner* — Frederick Calvetti
(74) *Attorney, Agent, or Firm* — Oblon, McClelland, Maier & Neustadt, L.L.P.

(57) ABSTRACT

A tip-base metal distance control method is provided. In this method, actual welding currents are measured under a predetermined actual welding condition, and an average actual welding current under the actual welding condition is then calculated. From a reference-current storage table, an average welding current under a welding condition that corresponds to the actual welding condition is extracted, and the extracted current value is set as a reference current. The calculated average actual welding current is then compared with the reference current to obtain a comparison result. The position of a welding torch in an upward or a downward direction is then corrected based on the comparison result.

9 Claims, 12 Drawing Sheets

(56) References Cited

U.S. PATENT DOCUMENTS

| | | | |
|---|---|---|---|
| 6,429,405 B2* | 8/2002 | Belloni et al. | 219/124.34 |
| 6,940,039 B2* | 9/2005 | Blankenship et al. | 219/130.01 |
| 7,683,290 B2* | 3/2010 | Daniel et al. | 219/130.01 |
| 7,999,208 B2* | 8/2011 | Shigeyoshi | 219/125.12 |
| 2005/0133488 A1 | 6/2005 | Blankenship et al. | |
| 2008/0083716 A1* | 4/2008 | Shigeyoshi | 219/125.12 |
| 2009/0179021 A1* | 7/2009 | Nishimura et al. | 219/136 |
| 2010/0065539 A1* | 3/2010 | Daniel et al. | 219/130.01 |
| 2011/0204034 A1* | 8/2011 | Schartner et al. | 219/137 PS |

FOREIGN PATENT DOCUMENTS

| | | |
|---|---|---|
| JP | 62-161478 | 7/1987 |
| JP | 64-048674 | 2/1989 |
| JP | 08-197245 | 8/1996 |
| JP | 11-058016 | 3/1999 |
| JP | 2001-246469 | 9/2001 |
| KR | 1988-0000949 | 6/1988 |
| KR | 1998-069422 | 10/1998 |
| KR | 2001-0095573 | 11/2001 |
| KR | 10-2006-0129269 | 12/2006 |
| WO | WO 2005/068124 A1 | 7/2005 |

OTHER PUBLICATIONS

Office Action issued Aug. 14, 2012 in Korean Application No. 10-2011-0014043 (With English Translation).

Office Action mailed Sep. 17, 2013 issued in corresponding JP Application No. 2010-033424.

\* cited by examiner

FIG. 5

| SET WELDING CURRENT VALUE \ SET WELDING VOLTAGE VALUE | 80% | 90% | 100% | 110% | 120% |
|---|---|---|---|---|---|
| 100 A | I_11 | I_12 | I_13 | I_14 | I_15 |
| 150 A | I_21 | I_22 | I_23 | I_24 | I_25 |
| 200 A | I_31 | I_32 | I_33 | I_34 | I_35 |
| 250 A | I_41 | I_42 | I_43 | I_44 | I_45 |
| 300 A | I_51 | I_52 | I_53 | I_54 | I_55 |
| 350 A | I_61 | I_62 | I_63 | I_64 | I_65 |
| 400 A | I_71 | I_72 | I_73 | I_74 | I_75 |
| 450 A | I_81 | I_82 | I_83 | I_84 | I_85 |
| 500 A | I_91 | I_92 | I_93 | I_94 | I_95 |

FIG. 6

| SET WELDING CURRENT VALUE \ SET WELDING VOLTAGE VALUE | 80% | 90% | 100% | 110% | 120% |
|---|---|---|---|---|---|
| 100 A | ERR | ERR | I_13 | I_14 | I_15 |
| 150 A | ERR | ERR | I_23 | I_24 | I_25 |
| 200 A | ERR | I_32 | I_33 | I_34 | I_35 |
| 250 A | I_41 | I_42 | I_43 | I_44 | I_45 |
| 300 A | I_51 | I_52 | I_53 | I_54 | I_55 |
| 350 A | I_61 | I_62 | I_63 | I_64 | I_65 |
| 400 A | I_71 | I_72 | I_73 | I_74 | I_75 |
| 450 A | I_81 | I_82 | I_83 | I_84 | ERR |
| 500 A | I_91 | I_92 | I_93 | ERR | ERR |

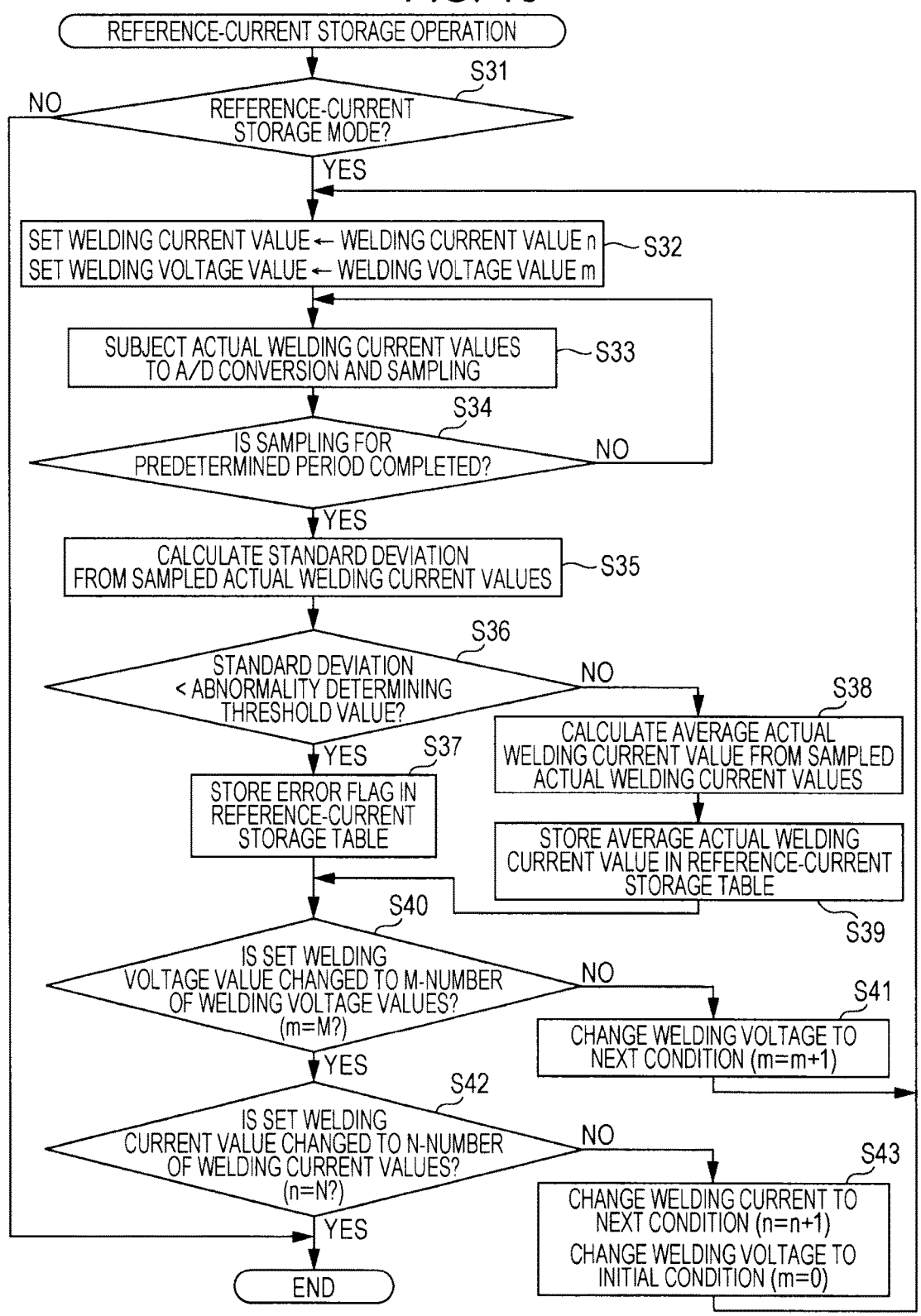

FIG. 12A
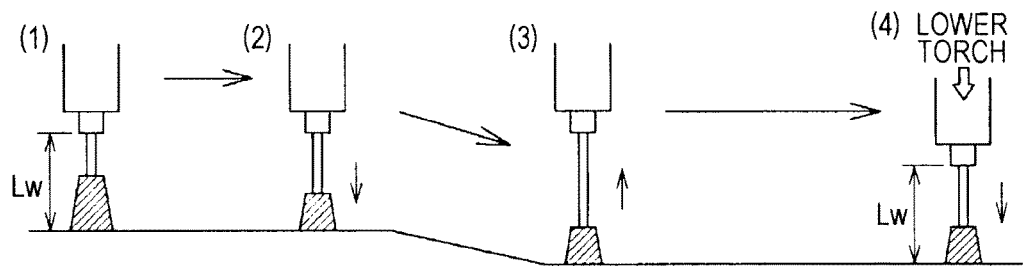
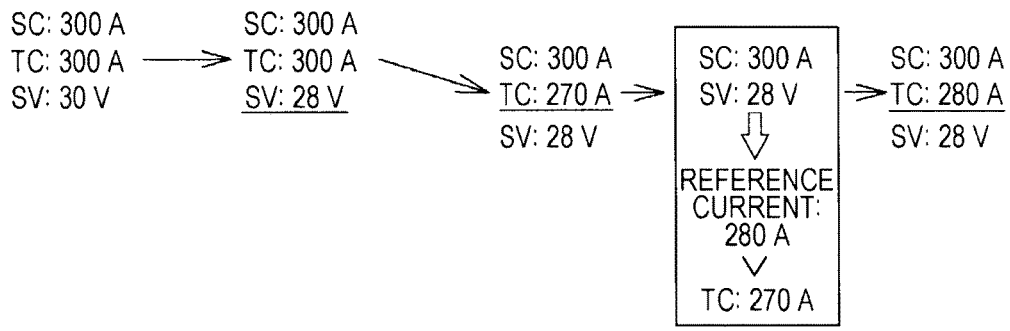
FIG. 12B
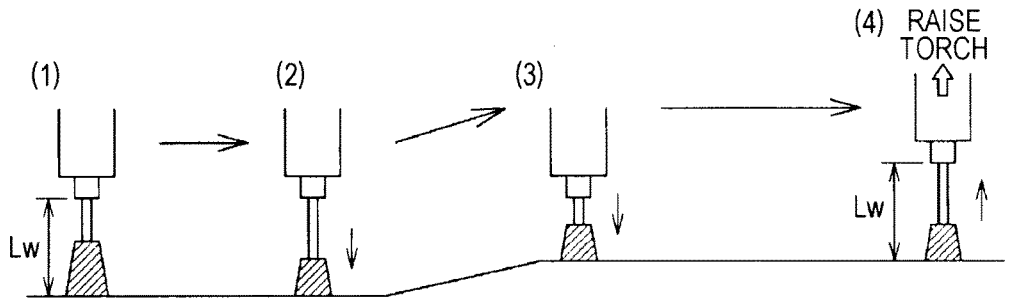
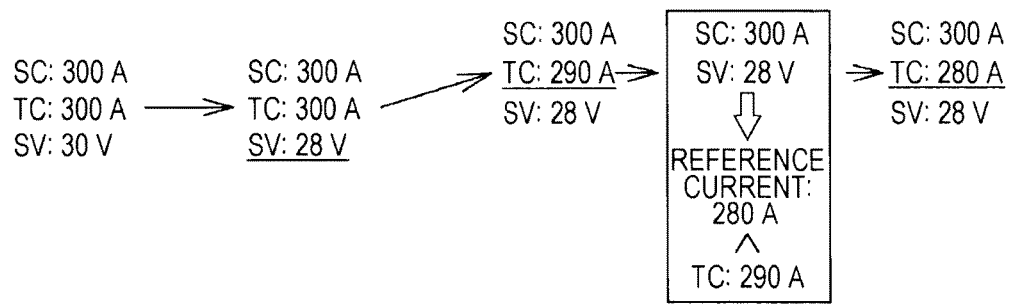

TIP-BASE METAL DISTANCE CONTROL METHOD FOR ARC WELDING SYSTEM, AND ARC WELDING SYSTEM

BACKGROUND OF THE INVENTION

1. Field of the Invention

The present invention relates to a technique that can control a tip-base metal distance in an arc welding system including a welding power source having a constant-voltage characteristic.

2. Description of the Related Art

In arc welding, it is important to maintain a fixed distance between a tip at an end of a welding torch and a base metal. That is, if the tip-base metal distance changes during welding, the penetration depth and the welding bead width change, or sputters, blowholes, etc. are caused. This makes welding unstable and lowers the welding quality. Particularly when automatic welding is performed with an arc welding system using a welding robot, if the tip-base metal distance changes, shieldability of shield gas is sometimes reduced, or the tip and the base metal, or a shield gas nozzle and the base metal sometimes touch each other. Hence, it is necessary to perform control so that a fixed tip-base metal distance is maintained.

In a general arc welding system using a welding power source having a constant-voltage characteristic, a copying operation (copying) is performed to maintain a fixed tip-base metal distance. The copying operation automatically corrects the position of a welding torch in an upward direction or a downward direction by causing the actual welding current value to coincide with a target current value. The constant-voltage characteristic refers to a characteristic in that the welding voltage value is fixed, regardless of increase or decrease in actual welding current value. A specific description will be given below of a flow of a procedure adopted when a tip-base metal distance control method of the related art is applied to an arc welding system, with reference to FIG. 13.

In the related art, it is first determined in Step S101 whether or not copying of the arc welding system is effective. When copying is effective (Yes in Step S101), in Step S102, actual welding current values detected by a sensor or the like are subjected to A/D conversion and sampling. In contrast, when copying is not effective (No in Step S101), the procedure is finished.

Next, in Step S103, it is determined whether or not sampling for a predetermined period is completed. When the sampling is completed (Yes in Step S103), an average actual welding current value is calculated from the sampled actual welding current values in Step S104. In contrast, when the sampling is not completed (No in Step S103), the procedure returns to Step S102.

Next, in Step S105, it is determined whether or not a set welding current value is larger than the average actual welding current value. When the set welding current value is larger than the average actual welding current value (Yes in Step S105), in Step S107, the actual welding current value is increased by correcting the position of the welding torch in the downward direction, and the procedure returns to Step S101. In contrast, when the set welding current value is not larger than the average actual welding current value (No in Step S105), the procedure proceeds to Step S106.

In Step S106, it is determined whether or not the set welding current value is smaller than the average actual welding current value. When the set welding current value is smaller than the average actual welding current value (Yes in Step S106), in Step S108, the actual welding current value is increased by correcting the position of the welding torch in the upward direction, and the procedure returns to Step S101. In contrast, when the set welding current value is not smaller than the average actual welding current value (No in Step S106), the procedure proceeds to Step S101.

Besides this copying operation of the related art, for example, Japanese Unexamined Patent Application Publication No. 11-58012 discloses a technique that indirectly controls the tip-base metal distance by controlling a wire extension length. That is, in this technique, resistances of wires having different extension lengths are measured and stored as data beforehand, the resistance of a wire in actual welding is calculated from the current and voltage values of the wire, and the calculated resistance is compared with the prestored resistances, whereby the extension length of the wire is estimated.

However, in the above-described copying operation of the related art, the change in set welding voltage value (set value of welding voltage) adversely affects the tip-base metal distance. That is, in arc welding using the welding power source having the constant-voltage characteristic, the arc length changes almost in proportion to the set welding voltage value. Further, if the arc length changes, the wire extension length at an end of the tip changes and the resistance of the wire changes. Hence, the actual welding current value also changes.

For this reason, for example, when arc welding is performed while the wire feeding speed and the tip-base metal distance are fixed, if the set welding voltage value decreases, the arc length decreases, and the actual welding current value also decreases. When the actual welding current value thus decreases, the above-described copying operation performs control so as to make the actual welding current value closer to the set welding current value. That is, the resistance of the wire is decreased and the actual welding current value is increased by correcting the position of the welding torch in the downward direction so as to decrease the wire extension length. Such correction of the position of the welding torch is performed until the actual welding current value coincides with the set welding current value. Therefore, in the copying operation of the related art, if the set welding voltage value changes, the tip-base metal distance also changes.

The set welding voltage value in arc welding is appropriately changed in correspondence with the change of the shape of the base metal and the welding position. Therefore, in the copying operation of the related art that does not consider the influence of the set welding voltage value, the tip-base metal distance cannot be accurately controlled to be fixed at an actual arc welding site. Moreover, devices, such as a sensor for current detection and an A/D converter for current conversion, are sometimes used to detect the actual welding current value and input the actual welding current value to a control unit in the copying operation of the related art. However, these devices usually have errors of several percent to ten percent. Therefore, in the copying operation of the related art that needs to obtain an accurate actual welding current value, it is difficult to accurately control the tip-base metal distance to be fixed.

Similarly to the related art, the above-described Japanese Unexamined Patent Application Publication No. 11-58012 does also not consider the influence of the set welding voltage value, and cannot accurately control the tip-base metal distance to be fixed. In addition, while the wire and the base metal need to be short-circuited during welding in order to calculate the resistance of the wire in the invention of the publication, this invention is not applicable, for example, to spray transfer (droplet transfer in which the wire end is melted by arc heat and droplets smaller than the diameter of the wire fly in the arc and are transferred onto the base metal).

SUMMARY OF THE INVENTION

The present invention has been made in view of these problems, and an object of the invention is to provide a technique that can accurately control a tip-base metal distance to be fixed even when a welding condition is changed or a device has an error in arc welding using a welding power source having a constant-voltage characteristic.

In order to solve the above problems, a tip-base metal distance control method for an arc welding system according to an aspect of the present invention corrects a position of a welding torch on the basis of a reference-current storage table storing predetermined welding conditions and average actual welding current values in arc welding performed under the predetermined welding conditions in correspondence with each other. The tip-base metal distance control method includes an actual-welding-current acquisition step of measuring actual welding current values by current measuring means under a predetermined actual welding condition and calculating an average actual welding current value under the actual welding condition with average-value calculation means; a reference-current acquisition step of extracting, from the reference-current storage table, the average actual welding current value that coincides with the actual welding condition and setting the extracted average actual welding current value as a reference current value by reference-current acquisition means; a current comparison step of comparing the average actual welding current value under the actual welding condition with the reference current value by current comparison means; and a welding-torch-position correction step of correcting the position of the welding torch in an upward direction or a downward direction by welding-torch-position correction means on the basis of a result of comparison performed in the current comparison step.

Through these steps, the tip-base metal distance control method for the arc welding system collects and holds average actual welding current values under predetermined welding conditions and corresponding welding conditions as data (reference-current storage table) beforehand. An average actual welding current value obtained beforehand serves as a reference current value, and the position of the welding torch is automatically corrected so that an average actual welding current value in actual welding coincides with the reference current value. Therefore, even when the welding condition (e.g., set welding voltage) changes and the arc length changes, a target actual welding current value is adjusted every time the arc length changes. Hence, the tip-base metal distance in actual welding is always controlled to be fixed. Further, even when the reference current value and the average actual welding current value in actual welding include errors of devices such as a sensor and an A/D converter, the position of the welding torch can be corrected by performing comparison including the errors. Thus, the tip-base metal distance in actual welding is always controlled to be fixed. Here, actual welding refers to arc welding performed by an operator at an actual working site.

Preferably, when the reference-current storage table does not include the welding condition corresponding to the actual welding condition in the reference-current acquisition step, the welding conditions and the corresponding average actual welding current values stored in the reference-current storage table are interpolated by reference-current interpolation means, and a value obtained by interpolation is set as the reference current value by the reference-current acquisition means.

In this case, in the tip-base metal distance control method for the arc welding system, even when arc welding is not performed beforehand under a welding condition that coincides with the actual welding condition, the reference current value can be calculated by interpolating the welding conditions and the average actual welding current values stored in the reference-current storage table. Therefore, even when welding is performed beforehand under a limited condition, the tip-base metal distance in actual welding can be controlled to be fixed.

Preferably, the tip-base metal distance control method using the arc welding system further includes, prior to the actual-welding-current acquisition step, an actual-welding-current pre-acquisition step of measuring the actual welding current values by the current measuring means under predetermined test welding conditions and calculating average actual welding current values under the test welding conditions by the average-current calculation means, and a reference-current storage-table generation step of storing the average actual welding current values under the test welding conditions and the corresponding test welding conditions in a table so as to generate the reference-current storage table by reference-current storage-table generating means.

In this case, the tip-base metal distance control method using the arc welding system performs test welding beforehand, and collects and holds stable average actual welding current values under various welding conditions as data (reference-current storage table) beforehand. Thus, the position of the welding torch can be automatically corrected so that an average actual welding current value in actual welding coincides with the reference current value. Here, test welding refers to arc welding experimentally performed prior to actual welding so as to generate the reference-current storage table.

Preferably, the arc welding is performed by bead welding for a flat plate or fillet welding in the test welding.

In this case, since the reference-current storage table stores welding conditions adopted when bead welding for the flat plate or fillet welding is performed and average actual welding current values, even when bead welding for the flat plate or fillet welding is performed in actual welding, the tip-base metal distance can be controlled to be fixed.

Preferably, in the reference-current acquisition step, when the test welding and the actual welding are performed by different methods, parameter correction means corrects the reference current value using a parameter obtained beforehand.

In this case, when the reference current value is corrected by the parameter, such as an offset, in accordance with the welding methods in test welding and actual welding, even if test welding and actual welding are performed by different methods, the average actual welding current value in actual welding can coincide with the stable reference current value. This allows the tip-base metal distance to be fixed in actual welding.

Preferably, in the actual-welding-current pre-acquisition step, when the actual welding current values are measured under a plurality of test welding conditions while changing the test welding condition and the average-value calculation means determines that a range of variations in the actual welding current values exceeds a predetermined threshold value, the average actual welding current values under the test welding conditions are regarded as errors.

In this case, when the range of variations in the actual welding current values measured beforehand in test welding exceeds the predetermined threshold value, error output is performed. Therefore, the test welding current values calculated in an unstable welding state are not used as the reference current values. This allows the tip-base metal distance to be more stably controlled in actual welding.

Preferably, in the actual-welding-current acquisition step and the actual-welding-current pre-acquisition step, the current measuring means measures the actual welding current values when a predetermined time elapses from starts of the test welding and the actual welding or changes of the test welding condition and the actual welding condition.

In this case, unstable actual welding current values obtained immediately after welding starts or the welding condition is changed are eliminated from samples for calculating an average actual welding current value. This allows the tip-base metal distance to be more stably controlled in actual welding.

A single arc welding system according to another aspect of the present invention includes a welding torch that supplies a wire to a base metal, and an arc copying unit that controls a copying operation of the welding torch. The single arc welding system corrects a position of the welding torch on the basis of a reference-current storage table that stores predetermined welding conditions and average actual welding current values provided when arc welding is performed under the welding conditions in correspondence with each other. The arc copying unit includes average-value calculation means that calculates an average actual welding current value under an actual welding condition, reference-current acquisition means that extracts, from the reference-current storage table, the average actual welding current value corresponding to the actual welding condition and setting the extracted average actual welding current value as a reference current value, current comparison means that compares the average actual welding current value under the actual welding condition with the reference current value, and welding-torch-position correction means that corrects the position of the welding torch in an upward direction or a downward direction on the basis of a result of comparison performed by the current comparison means.

In the single arc welding system having the above configuration, average actual welding current values under predetermined welding conditions and corresponding welding conditions are collected and held as data (reference-current storage table) beforehand. An average actual welding current value obtained beforehand serves as a reference current value, and the position of the welding torch is automatically corrected so that an average actual welding current value in actual welding coincides with the reference current value. Therefore, even when the welding condition (e.g., set welding voltage value) changes and the arc length changes, a target actual welding current value is adjusted every time the arc length changes. Hence, the tip-base metal distance in actual welding is always controlled to be fixed. Further, even when the reference current value and the average actual welding current value in actual welding include errors of devices such as a sensor and an A/D converter, the position of the welding torch can be corrected by performing comparison including the errors. Thus, the tip-base metal distance in actual welding is always controlled to be fixed.

A tandem arc welding system according to a further aspect of the present invention includes a welding torch that supplies two wires to a base metal, the two wires including a preceding wire and a following wire, and an arc copying unit that controls a copying operation of the welding torch. The single arc welding system corrects a position of the welding torch on the basis of a reference-current storage table for each of the wires in which predetermined welding conditions and average actual welding current values provided when arc welding is performed under the welding conditions are stored in correspondence with each other. The arc copying unit includes average-value calculation means that calculates an average actual welding current value of the preceding wire under an actual welding condition, reference-current acquisition means that extracts, from the reference-current storage table for the preceding wire, the average actual welding current value corresponding to the actual welding condition and that sets the extracted average actual welding current value as a reference current value, current comparison means that compares the average actual welding current value under the actual welding condition with the reference current value, and welding-torch-position correction means that corrects the position of the welding torch in an upward direction or a downward direction on the basis of a result of comparison performed by the current comparison means.

In the tandem arc welding system having the above configuration, even when arc welding is performed by supplying two wires, the preceding wire and the following wire, to the base metal, the tip-base metal distance can be controlled properly.

According to the tip-base metal distance control method for the arc welding system and the tandem arc welding system of the present invention, even when the set welding voltage value is changed or when the devices have errors, the position of the welding torch is automatically corrected so that the actual welding current value becomes closer to a stable reference current value obtained beforehand. Hence, it is possible to always maintain a fixed tip-base metal distance during welding and to stably perform arc welding.

BRIEF DESCRIPTION OF THE DRAWINGS

FIG. 1A illustrates a tip-base metal distance in bead welding, and FIG. 1B illustrates a tip-base metal distance in fillet welding;

FIG. 2A illustrates a single arc welding system, and FIG. 2B illustrates a tandem arc welding system;

FIG. 5 is a reference-current storage table adopted in a tip-base metal distance control method according to a first embodiment;

FIG. 6 is a reference-current storage table adopted in a tip-base metal distance control method according to a third embodiment;

FIG. 10 is a flowchart showing a reference-current storage process in the tip-metal base distance control method of the third embodiment;

FIG. 11A illustrates a comparative example in which the tip-metal base distance is controlled by a control method of the related art, and FIG. 11B illustrates a first example in which the tip-base metal distance is controlled by the control method of the present invention;

FIGS. 12A and 12B schematically illustrate examples of tip-base metal distance control methods, FIG. 12A illustrates a second example in which the tip-base metal distance is controlled by the control method of the present invention and a weld line descends, and FIG. 12B illustrates a third example in which the tip-base metal distance is controlled by the control method of the present invention and a weld line ascends.

DESCRIPTION OF THE PREFERRED EMBODIMENTS

Arc welding systems and tip-base metal distance control methods in the arc welding systems according to embodiments of the present invention will be described in detail.

Figure 1A:
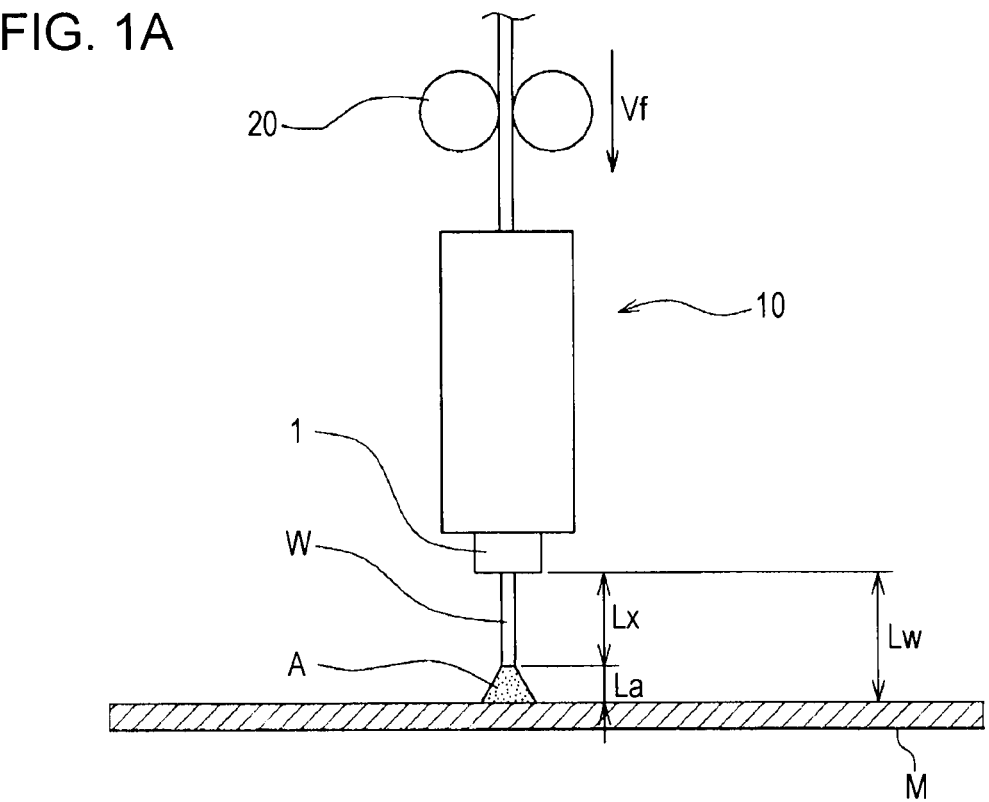
FIGS. 1A and 1B schematically illustrate tip-base metal distances in arc welding.
Figure 1B:
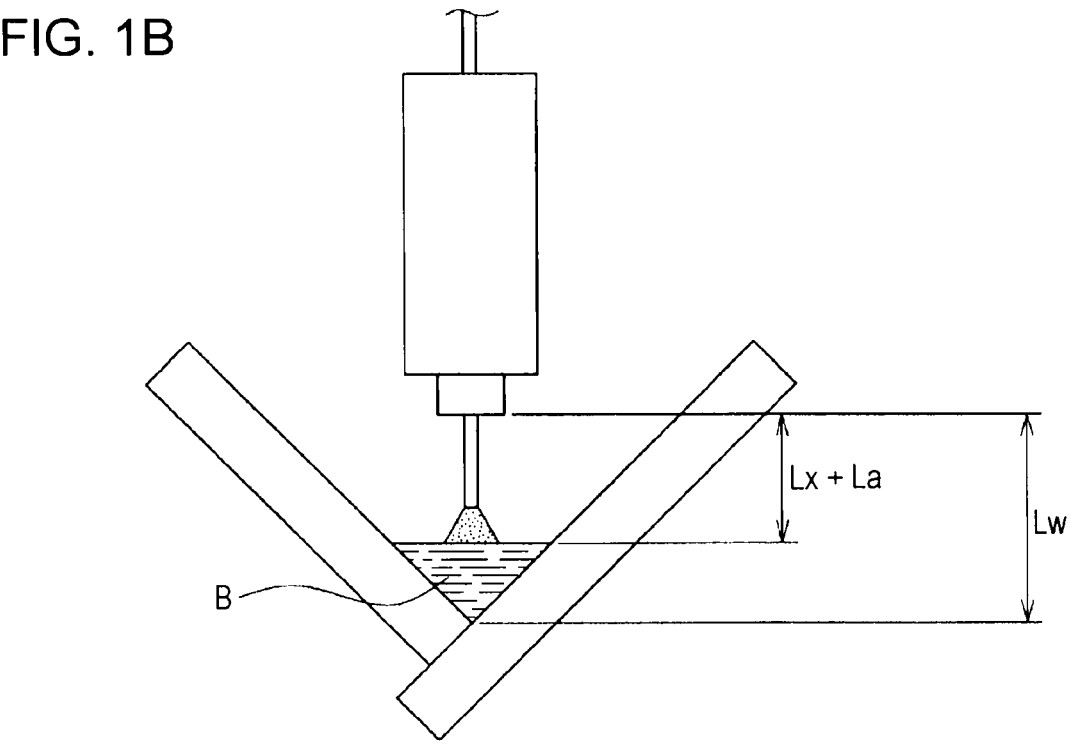

In the description of the embodiments, in bead welding for a flat plate illustrated in FIG. 1A, a tip-base metal distance Lw refers to a distance obtained by adding an extension length Lx of a wire to be fed from a tip 1 of a welding torch 10 at a wire feeding speed Vf by a wire feeding motor 20 and an arc length La of an arc A. Similarly, in fillet welding illustrated in FIG. 1B, the tip-base metal distance Lw refers to a distance obtained by adding an extension length Lx on the center line of a weld line, an arc length La, and a depth of a welding bead B.

Figure 2A:
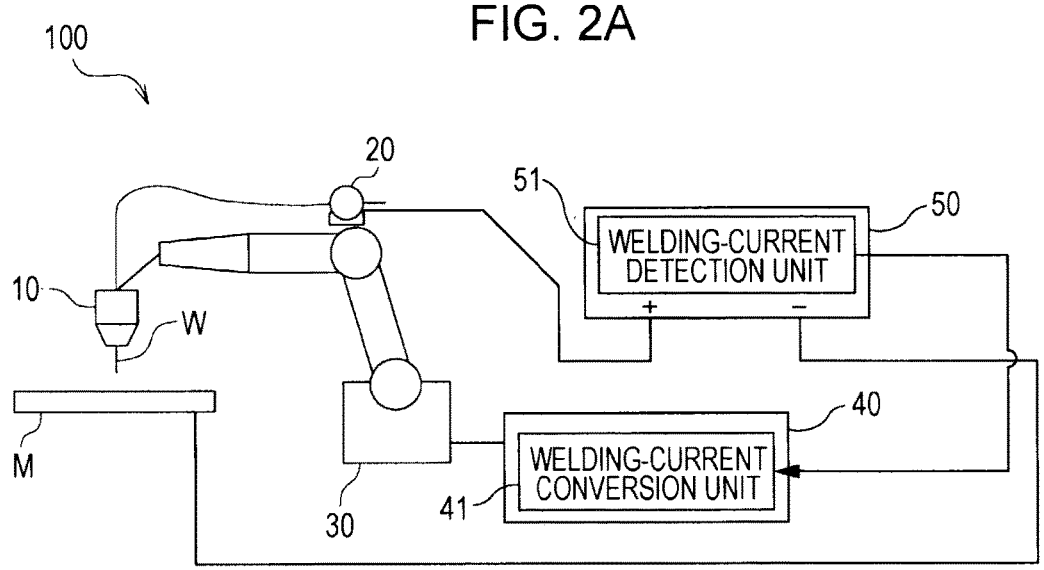
FIGS. 2A and 2B schematically illustrate examples of arc welding systems according to embodiments.
Figure 3:
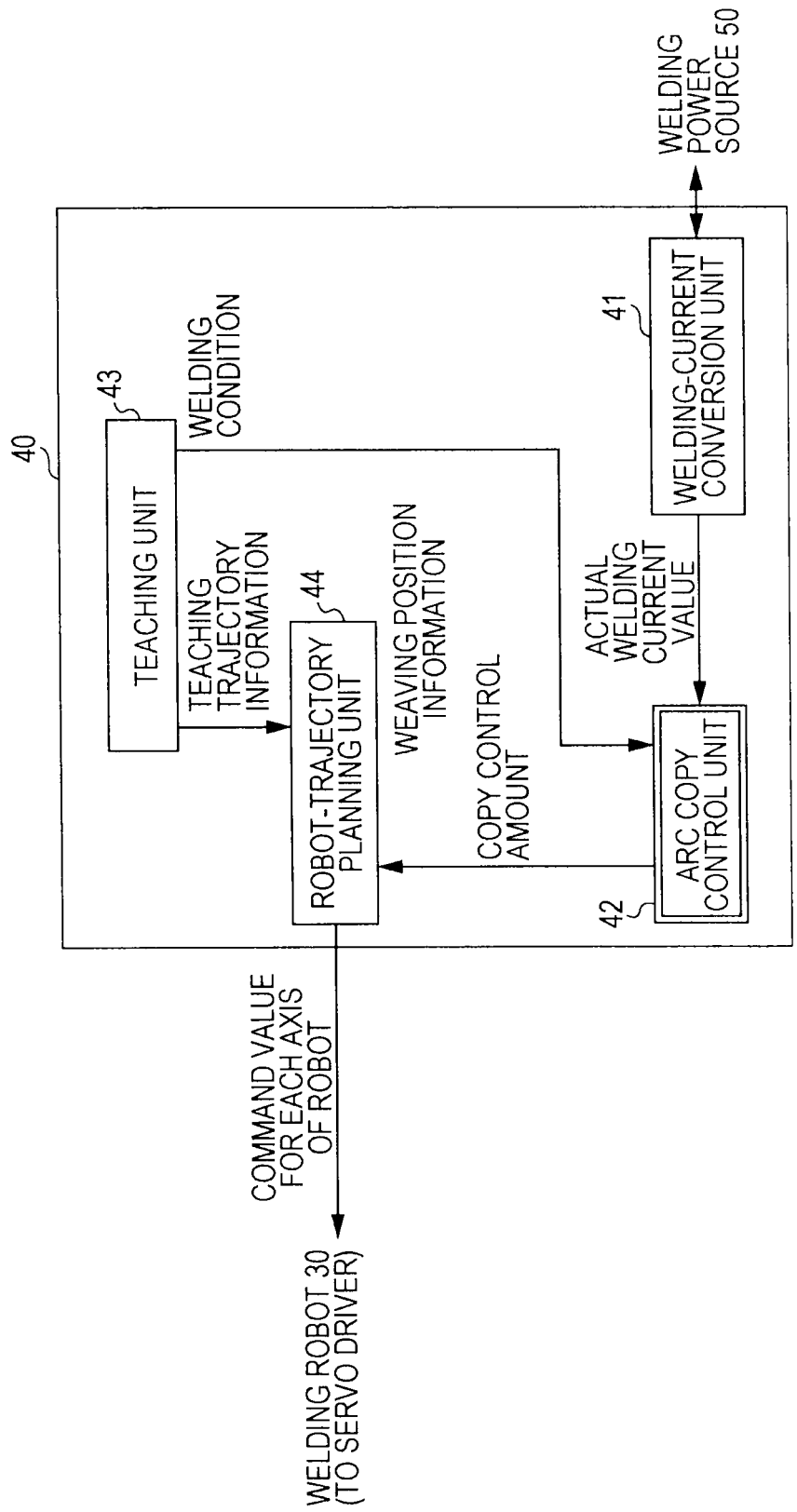
FIG. 3 is a block diagram illustrating an internal configuration of a robot controller that controls an arc welding system according to an embodiment.

With reference to FIGS. 2A and 3, a description will be given below of an example of a single arc welding system that carries out a tip-base metal distance control method according to an embodiment.

A single arc welding system 100 conducts arc welding on a weld line of a base metal M while correcting the position of a welding torch 10 in the upward or downward direction or weaving the welding torch 10 in the right-left direction. As illustrated in FIG. 2A, the single arc welding system 100 includes the welding torch 10, a wire feeding motor 20, a welding robot 30, a robot controller 40, and a welding power source 50. The structures provided in the single arc welding system 100 will be described in detail below.

The welding torch 10 supplies a wire W to a base metal M, and opposes the base metal M with a tip-base metal distance Lw therebetween. The wire W passes through the welding torch 10, and extends from an end of a tip 1 of the welding torch 10 (see FIG. 1) toward the base metal M by a predetermined extension length. The welding torch 10 may include a shield gas nozzle that supplies shield gas to the base metal.

The wire feeding motor 20 feeds the wire W to the welding torch 10. As described above, the wire feeding speed is substantially proportional to the set welding current value. Therefore, when the operator changes the set welding current value, the wire feeding speed of the wire feeding motor 20 is first changed.

The welding robot 30 has the welding torch 10 at a leading end thereof, and corrects the position of the welding torch 10 in the upward direction or the downward direction with respect to a welding direction of the base metal M or weaves the welding torch 10 in the right-left direction by using an arm. The welding robot 30 is connected to the robot controller 40, which will be described below, and moves the welding torch 10 in the directions according to a command from the robot controller 40.

The robot controller 40 moves the welding torch 10 in predetermined directions with respect to the welding direction by means of the welding robot 30. That is, the robot controller 40 controls the moving position and moving direction of the welding torch 10. As illustrated in FIG. 3, the robot controller 40 includes a welding-current conversion unit 41, an arc copy control unit 42, a teaching unit 43, and a robot-trajectory planning unit 44. Details of these units provided in the robot controller 40 will be described below.

The welding power source 50 supplies electric power to the wire W and the base metal M so as to generate an arc therebetween. The welding power source 50 has the above-described constant-voltage characteristic, and includes a welding-current detection unit 51 serving as a current measuring means. This welding-current detection unit (current measuring means) 51 detects actual current values as analog data at predetermined sampling intervals in test welding and actual welding.

The internal configuration of the above-described robot controller 40 will be described in detail below with reference to FIG. 3.

The welding-current conversion unit 41 converts analog data on actual welding current values into digital data. In both test welding and actual welding, the welding-current conversion unit 41 receives analog data on actual welding current values from the welding-current detection unit 51 of the welding power source 50, which will be described below, at predetermined sampling intervals. The welding-current conversion unit 41 subjects the input actual welding current values to current conversion (A/D conversion), and outputs the converted actual welding current values to the arc copy control unit 42.

Figure 4:
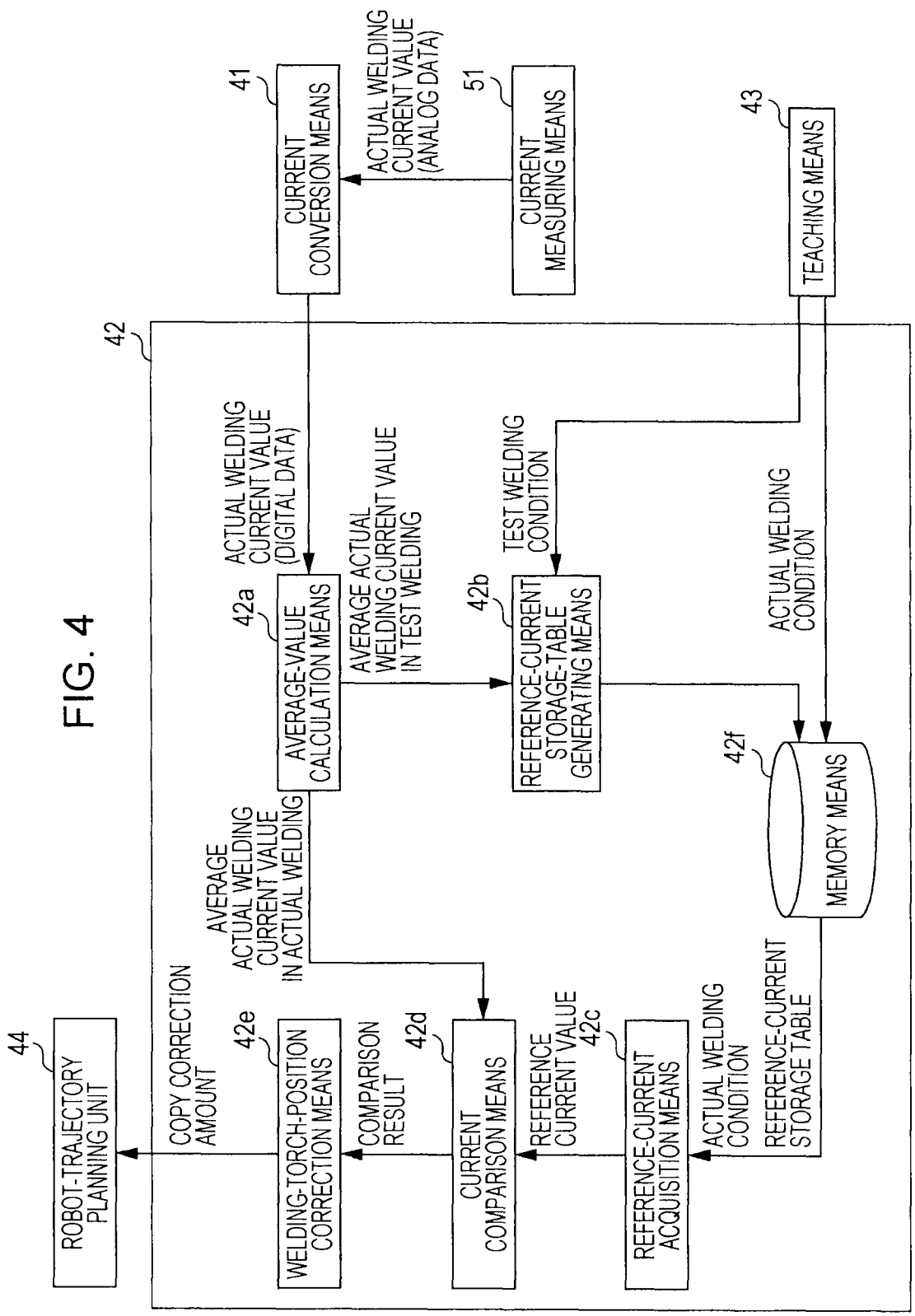
FIG. 4 is a block diagram illustrating an internal configuration of a copy control unit in the robot controller that controls the arc welding system of the embodiment.

The arc copy control unit 42 controls copying of the welding torch 10 in accordance with the welding state. More specifically, the arc copy control unit 42 generates a copy correction amount of the welding torch 10 from the actual welding current value and the corresponding welding condition, and outputs the copy correction amount to the robot-trajectory planning unit 44. As illustrated in FIG. 4, the arc copy control unit 42 includes an average-value calculation means 42a, a reference-current storage-table generating means 42b, a reference-current acquisition means 42c, a current comparison means 42d, a welding-torch-position correction means 42e, and a memory means 42f. Details of these means provided in the arc copy control unit 42 will be described below.

The teaching unit 43 teaches operation trajectories of arc welding, and stores data on the operation trajectories taught beforehand. The teaching unit 43 extracts a target welding position from the data, and outputs the target welding position to the robot-trajectory planning unit 44. Further, the teaching unit 43 receives welding conditions (test welding condition, actual welding condition) corresponding to the actual welding current values subjected to A/D conversion by the welding-current conversion unit 41. Then, the teaching unit 43 outputs the welding conditions to the arc copy control unit 42, as illustrated in FIG. 3.

The robot-trajectory planning unit 44 controls the position and operation trajectory of the welding torch 10 on the basis of instructions from the arc copy control unit 42 and the teaching unit 43. The robot-trajectory planning unit 44 generates a command value for each axis of the robot from the copy correction amount input from the arc copy control unit 42 and the teaching trajectory information input from the teaching unit 43, and outputs the command value to a servo driver of the welding robot 30, so that the position or the operation trajectory of the welding torch 10 is corrected. The servo driver refers to a driver that operates the welding torch 10 at the end of the welding robot 30.

The internal configuration of the above-described arc copy control unit 42 will be described in detail below with reference to FIG. 4.

The average-value calculation means 41*a* calculates an average actual welding current value in test welding (under a test welding condition) and an average actual welding current value in actual welding (under an actual welding condition) from the actual welding current values detected by the welding-current detection unit 51 at the predetermined sampling intervals. The reference-current storage-table generating means 42*b* stores the average actual welding current values calculated by the average-value calculation means 41*a* and the corresponding test welding conditions in a table so as to generate a reference-current storage table.

The reference-current acquisition means 42*c* checks an actual welding condition with the test welding conditions stored in the reference-current storage table so as to extract an average actual welding current value in test welding that corresponds to (coincides with) the actual welding condition, and sets the extracted average actual welding current value as a reference current value. The current comparison means 42*d* compares the average actual welding current value in actual welding calculated by the average-value calculation means 41*a* with the reference current value.

The welding-torch-position correction means 42*e* corrects the position of the welding torch 10 in the upward direction or the downward direction on the basis of the comparison result of the current comparison means 42*d*. More specifically, the welding-torch-position correction means 42*e* corrects the position of the welding torch 10 in the upward direction when the average actual welding current value in actual welding is larger than the reference current value, and corrects the position of the welding torch 10 in the downward reaction when the average actual welding current value in actual welding is smaller than the reference current value.

Next, the flow of control over the tip-base metal distance Lw in the above-described arc copy control unit 42 of the single arc welding system 100 will be described in detail with reference to FIG. 4.

First, in a preparation process for generating a reference-current storage table, when the operator performs test welding under a predetermined test welding condition, the current measuring means (welding-current detection unit) 51 of the welding power source 50 detects analog data on actual welding current values in test welding at predetermined sampling intervals, and outputs the analog data to the current conversion means (welding-current conversion unit) 41 of the robot controller 40.

Next, the current conversion means 41 subjects the input actual welding current values to A/D conversion, and outputs the converted actual welding current values to the average-value calculation means 42*a*. Further, the teaching means (teaching unit) 43 of the robot controller 40 outputs test welding conditions corresponding to the actual welding current values to the reference-current storage-table generating means 42*b*.

Then, the average-value calculation means 42*a* calculates an average actual welding current value from the input actual welding current values, and outputs the calculated average actual welding current value in test welding to the reference-current storage-table generating means 42*b*. The reference-current storage-table generating means 42*b* stores the input test welding conditions and the average actual welding current value in test welding in a table so as to generate a reference-current storage table, and stores the reference-current storage table in the memory means 42*f*.

Next, in a position correction process for correcting the position of the welding torch 10, when the operator performs actual welding under a predetermined actual welding condition, the current measuring means (welding-current detection unit) 51 of the welding power source 50 detects analog data on actual welding current values in actual welding at predetermined sampling intervals, and outputs the analog data to the current conversion means (welding-current conversion unit) 41. The current conversion means 41 subjects the input actual welding current values to A/D conversion, and outputs the converted actual welding current values to the average-value calculation means 42*a*. Further, the teaching means (teaching unit) 43 of the robot controller 40 outputs actual welding conditions corresponding to the actual welding current values to the memory means 42*f*.

Next, the average-value calculation means 42*a* calculates an average actual welding current value from the input actual welding current values, and outputs the average actual welding current value in actual welding to the current comparison means 42*d* of the robot controller 40. By reference to the actual welding conditions and the reference-current storage table stored in the memory means 42*f*, the reference-current acquisition means 42*c* determines whether or not the reference-current storage table includes a test welding condition that coincides with the actual welding condition. When the reference-current storage table includes a test welding condition that coincides with the actual welding condition, the reference-current acquisition means 42*c* extracts an average actual welding current value corresponding to the test welding condition from the reference-current storage table, and sets the extracted average actual welding current value as a reference current value. Then, the reference-current acquisition means 42*c* outputs the reference current value to the current comparison means 42*d*.

Next, the current comparison means 42*d* compares the input average actual welding current value in actual welding with the reference current value, and outputs the comparison result to the welding-torch-position correction means 42*e*. According to the comparison result, the welding-torch-position correction means 42*e* generates a copy correction amount for correcting the position of the welding torch 10 in the upward or downward direction, and outputs the copy correction amount to the robot-trajectory planning unit 44. As will be described below, on the basis of the input copy correction amount, the robot-trajectory planning unit 44 commands the welding robot 30 to correct the position of the welding torch 10.

Besides the above-described means, the arc copy control unit 42 may include, for example, a reference-current interpolation means, a parameter correction means, an error-flag generating means, and an error output means that are not illustrated.

The reference-current interpolation means interpolates the test welding conditions and the average actual welding current values in test welding stored in the reference-current storage table when test welding is not performed under the same condition as that for actual welding condition and the reference current value cannot be directly acquired from the reference-current storage table. For example, the reference-current interpolation means calculates an average actual welding current value in actual welding by obtaining a relational expression from the test welding conditions prestored in the reference-current storage table and the corresponding average actual welding current values and substituting an actual welding condition in the relational expression.

The parameter correction means corrects the reference current value by a parameter, such as an offset, when a test welding method and an actual welding method are different. For example, when bead welding is conducted on a flat plate in test welding as in FIG. 1A and fillet welding is conducted in actual welding as in FIG. 1B, the tip-base metal distance Lw increases by an amount corresponding to the height of a welding bead B, and this causes the necessity of correcting the reference current value. Therefore, in this case, the reference current value is corrected by a prepared parameter such as a positive offset for decreasing the reference current value by the amount corresponding to the welding bead B or a negative offset for increasing the reference current value by the amount corresponding to the welding bead B. This removes the influence of the difference in welding method, and allows the average actual welding current value in actual welding to coincide with the stable reference current value.

When the error-flag generating means determines that the range of variations in actual welding current values measured corresponding to test welding conditions for calculating an average actual welding current value in test welding exceeds a predetermined threshold value, the error-flag generating means considers the average actual welding current value in test welding to be an error and sets an error flag. Further, the error output means performs error output to finish copying when the reference-current acquisition means 42c determines that the average actual welding current value in test welding set as the reference current value is an error.

A detailed description will be given of a tip-base metal distance control method according to a first embodiment using the above-described arc welding system 100 with appropriate reference to FIGS. 2 to 6.

The tip-base metal distance control method of the first embodiment is characterized in controlling the tip-base metal distance Lw by a copying operation different from that of the related art, and the control method is roughly divided into a preparation process and a position correction process. The processes of the tip-base metal distance control method of the first embodiment will be described in detail below.

(1) Preparation Process

A preparation process prepares a reference-current storage table prior to a position correction process. More specifically, the preparation process includes an actual-welding-current pre-acquisition step and a reference-current storage-table generating step. These steps will be described in detail below.

Actual-Welding-Current Pre-Acquisition Step

In this step, test welding is performed with a predetermined tip-base metal distance Lw prior to actual welding, and an average actual welding current value serving as the average value of actual welding currents is calculated. In this step, first, the operator performs test welding under a predetermined test welding condition, and the current measuring means (welding-current detection unit) 51 of the arc welding system 100 samples stable actual welding current values in test welding at predetermined sampling intervals. Then, the average-value calculation means 41a of the arc welding system 100 calculates an average actual welding current value from a plurality of actual welding current values sampled by the current measuring means 51, and stores the calculated average actual welding current value in the memory means 42f of the arc welding system 100.

In this step, the operator performs test welding while changing the test welding condition within a predetermined range. The average-value calculation means 41a of the arc welding system 100 measures and calculates actual welding current values and average actual welding current values in correspondence with different test welding conditions, and stores the actual welding current values and the average actual welding current values in the above-described memory means 42f. The average actual welding current values thus obtained under various test welding condition in this step are average actual welding current values obtained when arc welding is stable. Therefore, the average actual welding current values are set as reference current values (target current values in a copying operation) in actual welding, as will be described below.

Here, the above-described predetermined tip-base metal distance Lw is not determined beforehand, but is appropriately changed and adjusted by the operator according to various conditions such as the welding portion and welding position. Usually, the predetermined tip-base metal distance Lw is a distance that is judged optimum when the operator performs welding under a predetermined welding condition, and is obtained according to the experimental rule.

More specifically, the above-described test welding condition refers to a set welding current value (a set value of welding current) and a set welding voltage value (a set value of welding voltage) to be set in the arc welding system 100 by the operator in arc welding.

The above-described test welding is preferably performed by bead welding for a flat plate or fillet welding. According to the tip-base metal distance control method of the first embodiment, the operator can perform test welding beforehand by a welding method that conforms more to actual welding, and can collect and hold, as data, stable average actual welding current values corresponding to various welding conditions. Therefore, in both bead welding for the flat plate and fillet welding, the tip-base metal distance Lw in actual welding can be controlled to be fixed.

In this step, the above-described average-value calculation means 41a may calculate an average actual welding current value from actual welding current values that the current measuring means 51 measures after a predetermined time period elapses from the start of test welding or the change of the test welding condition. This is because the welding state is often in a transient state in test welding immediately after a new test welding condition is set or the test welding condition is changed and actual welding current values are sometimes unstable.

The above-described predetermined time period refers to a period from when test welding starts or the test welding condition is changed to when the welding state comes out of the transient state. Usually, the predetermined time period is obtained according to the experimental rule by performing welding by the operator under predetermined welding conditions. In the tip-base metal distance control method of the first embodiment, the actual welding current values in the period when test welding is unstable are thus eliminated from the samples for calculating the average actual welding current value. This allows the average actual welding current value to be calculated more accurately.

Reference-Current Storage-Table Generation Step

In this step, average actual welding current values calculated in test welding by the reference-current storage-table generating means 42b of the arc welding system 100 and corresponding test welding conditions are stored in a table so as to generate a reference-current storage table illustrated in FIG. 5. Here, the reference-current storage table refers to a table in which average actual welding current values obtained when arc welding is stable and welding conditions (set welding current values, set welding voltage values, etc.) adopted when the average actual welding current values are measured and calculated are stored in correspondence with each other. The reference-current storage table will be described in detail below with reference to FIG. 5.

In the reference-current storage table of FIG. 5, set welding current values that the operator sets in test welding are stored in a column header serving as the leftmost column. While the set welding current values are stored at given intervals in the column header (intervals of 50 A in FIG. 5), the intervals of the set welding current values are just exemplary and can be arbitrarily changed depending on how finely the operator performs test welding. Therefore, the intervals of the set welding current values are 1 A when the operator performs test welding while changing the set welding current value at intervals of 1 A, and are 10 A when the operator performs test welding while changing the set welding current value at intervals of 10 A.

Further, set welding voltage values that the operator sets in test welding are stored in a row header serving as the uppermost row in the reference-current storage table of FIG. 5. While the set welding voltage values are stored at given intervals in the row header (intervals of 10% in FIG. 5), the intervals of the set welding voltage values are just exemplary and can be arbitrarily changed depending on how finely the operator performs test welding. Therefore, the intervals of the set welding voltage values are 1 V when the operator performs test welding while changing the set welding voltage value at intervals of 1 V, and are 10 V when the operator performs test welding while changing the set welding voltage value at intervals of 10 V. Since the set welding voltage values in FIG. 5 adopt central setting (a function that sets the most suitable voltage value for the welding current as 100%), concrete voltage values are not stored, but the percentages (%) are stored. However, concrete voltage values may be stored as the set welding voltages.

In the reference-current storage table of FIG. 5, average actual welding current values in test welding are stored in cells where the rows of the set welding current values and the columns of the set welding voltage values intersect. The average actual welding current values in test welding are selected as reference current values later. While reference current values (average actual welding current values in test welding) are denoted by symbols of I_11 to I_95 in FIG. 5 for convenience, in actuality, concrete average actual welding current values calculated in test welding are stored, as described above.

In the tip-base metal distance control method of the first embodiment, the relationships between various welding conditions and actual welding current values can be held as data by thus generating the reference-current storage table beforehand.

(2) Position Correction Process

In the position correction process, the position of the welding torch 10 is corrected in the upward direction or the downward direction on the basis of the reference-current storage table prepared in the preparation process. More specifically, the position correction process includes an actual-welding-current acquisition step, a reference-current acquisition step, a current comparison step, and a welding-torch-position correction step. These steps will be described in detail below.

Actual-Welding-Current Acquisition Step

In this step, actual welding is performed with a predetermined tip-base metal distance Lw and under a predetermined actual welding condition, and an average actual welding current value is calculated. Since a calculation method and means for the average actual welding current value in this step are similar to those adopted in the actual-welding-current pre-acquisition step, descriptions thereof are omitted. An average actual welding current value in actual welding calculated in this step is compared with the reference current value serving as the average actual welding current value in test welding by the current comparison means 42d, as will be described below. On the basis of the comparison result, the position of the welding torch 10 is corrected in the upward direction or the downward direction.

In this step, the given tip-base metal distance Lw refers to a distance similar to the above-described tip-base metal distance Lw in test welding. Further, in this step, the actual welding condition refers to a set welding current value and a set welding voltage value set in the arc welding system 100 by the operator in arc welding, similarly to the above-described test welding condition.

In this step, similarly to test welding, the average-value calculation means 41a of the arc welding system 100 may calculate an average welding current value from actual welding current values measured after a predetermined time period elapses from the start of actual welding or the change of the actual welding condition. In the tip-base metal distance control method of the first embodiment, the actual welding current values in the period when test welding is unstable are thus eliminated from the samples for calculating the average actual welding current value. This allows the average actual welding current value to be calculated more accurately.

Reference-Current Acquisition Step

In this step, the reference-current acquisition means 42c of the arc welding system 100 checks the actual welding condition in actual welding with the test welding conditions stored in the reference-current storage table generated beforehand, extracts an average actual welding current value in test welding corresponding to the actual welding condition and sets the extracted average actual welding current value as a reference current value.

This step will be specifically described with reference to the reference-current storage table of FIG. 5. For example, when the set welding current value is 100 A and the set welding voltage value is 90% in actual welding, the reference-current acquisition means 42c of the arc welding system 100 extracts an average actual welding current value in test welding stored in a cell I_12, and sets the extracted average actual welding current value as a reference current value. Alternatively, for example, when the set welding current value is 300 A and the set welding voltage value is 120% in actual welding, the reference-current acquisition means 42c extracts an average actual welding current value in test welding stored in a cell I_55, and sets the extracted average actual welding current value as a reference current value.

In the tip-base metal distance control method of the first embodiment, a stable average actual welding current value under the actual welding condition can be easily extracted by checking the actual welding condition with the test welding conditions with reference to the reference-current value storage table. Further, this average actual welding current value can be set as a reference to be copied by the actual welding current value in actual welding, that is, as a reference current value.

When the welding method is different between test welding and actual welding, the reference current value is preferably corrected by the above-described parameter correction means (not illustrated) of the arc welding system 100. As described above, for example, when bead welding is conducted on a flat plate in test welding, as in FIG. 1A, and fillet welding is conducted in actual welding, as in FIG. 1B, the height of the welding bead B is not negligible, and it is necessary to correct the reference current value.

For example, a parameter used for correction is a positive offset for decreasing the reference current value by the amount corresponding to the height of the welding bead B or a negative offset for increasing the reference current value by the amount corresponding to the height of the welding bead B. The parameter is experimentally obtained and is stored in the memory means 42f of the arc welding system 100. By thus correcting the reference current value by the prepared parameter, the influence due to the difference in welding method can be removed, and the average actual welding current value in actual welding can coincide with the stable reference current value.

In the tip-base metal distance control method of the first embodiment, the reference current value is thus corrected in accordance with the welding methods in test welding and actual welding. This allows the average actual welding current value in actual welding to coincide with the stable reference current value even when the welding method is different between test welding and actual welding, so that the tip-base metal distance Lw in actual welding can be controlled to be fixed.

Current Comparison Step

In this step, the current comparison means 42d of the arc welding system 100 compares an average actual welding current value under a predetermined actual welding condition with the reference current value acquired in the above-described reference-current acquisition step. Here, the reference current value refers to an average actual welding current value obtained when arc welding is stable. Therefore, by comparing the average actual welding current value in actual welding with the reference current value, it can be determined whether or not the average actual welding current value in actual welding is stable, that is, whether or not actual welding is performed stably.

Welding-Torch-Position Correction Step

In this step, the welding-torch-position correction means 42e of the arc welding system 100 corrects the position of the welding torch 10 at the end of the welding robot 30 in the upward direction or the downward direction on the basis of the result of comparison in the current comparison step so that the actual welding current value in actual welding becomes stable. In this step, by utilizing the characteristic of arc welding in that the resistance of the wire is changed and the actual welding current value is also changed by correcting the position of the welding torch 10 so as to change the extension length Lx of the wire W, the actual welding current value is adjusted and the tip-base metal distance Lw is controlled by correcting the position of the welding torch 10. More specifically, the operation of this step is performed as follows.

For example, when the current comparison means 42d determines that the average actual welding current value in actual welding coincides with the reference current value, the actual welding current value is stable. Hence, the welding-torch-position correction means 42e does not correct the position of the welding torch 10.

In contrast, when the current comparison means 42d determines that the average actual welding current value in actual welding is larger than the reference current value, the welding-torch-position correction means 42e corrects the position of the welding torch 10 in the upward direction. Then, the extension length Lx of the wire W increases, and the average actual welding current value decreases. The welding-torch-position correction means 42e corrects the position of the welding torch 10 in the upward direction until the average actual welding current value coincides with the reference current value.

When the current comparison means 42d determines that the average actual welding current value in actual welding is smaller than the reference current value, the welding-torch position correction means 42e corrects the position of the welding torch 10 in the downward direction. Then, the extension length Lx of the wire W decreases, and the average actual welding current value increases. The welding-torch-position correction means 42e corrects the position of the welding torch 10 in the downward direction until the average actual welding current value coincides with the reference current value.

In this way, in the tip-base metal distance control method of the first embodiment, test welding is performed beforehand, data on stable actual welding current values under various welding conditions is collected so as to generate a reference current value, and the position of the welding torch 10 is corrected so that the actual welding current value in actual welding becomes closer to the reference current value. Therefore, even when the set welding voltage value is changed and the arc length is also changed, the target actual welding current value is adjusted every time when the arc length changes. Hence, the tip-base metal distance Lw is controlled so as to be fixed. Further, even when the actual welding current value in actual welding and the reference current value have errors, comparison can be made to correct the position of the welding torch 10 in a state in which the errors are left. For this reason, the tip-base metal distance Lw is controlled to be fixed, regardless of errors of the devices such as the sensor and the A/D converter. Therefore, the tip-base metal distance Lw during welding can be accurately controlled to be fixed, regardless of the change in welding condition and the errors of the devices.

Next, a detailed description will be given of a tip-base metal distance control method according to a second embodiment using the above-described arc welding system 100.

The tip-base metal distance control method of the second embodiment is similar to the above-described first embodiment in including an actual-welding-current pre-acquisition step, a reference-current storage-table generation step, an actual-welding-current acquisition step, a reference-current acquisition step, a current comparison step, and a welding-torch-position correction step.

However, in the second embodiment, when the reference-current acquisition means 42c of the arc welding system 100 determines in the reference-current acquisition step that a reference-current storage table does not include a test welding condition that coincides with an actual welding condition, a reference-current interpolation means (not illustrated) of the arc welding system 100 interpolates test welding conditions stored in the reference-current storage table and average actual welding current values in the test welding conditions, and the reference-current acquisition means 42c sets an average actual welding current value obtained by interpolation as a reference current value.

This operation is performed for the following reason. As described above, since the intervals at which the operator changes the test welding condition (e.g., set welding current value, set welding voltage value) during test welding are arbitrarily determined, test welding is sometimes not performed under the same condition as that of actual welding, and a reference current value cannot be directly acquired from the reference-current storage table. The second embodiment will be specifically described below with reference to the reference-current storage table of FIG. 5.

For example, when the set welding current value and the set welding voltage value serving as the actual welding condition are set to be 270 A and 95%, respectively, the column header and the row header of the reference-current storage table of FIG. 5 does not include a set welding current value and a set welding voltage value corresponding to these values. Accordingly, the above-described reference-current interpolation means first calculates a first interpolation current value (={(I_53−I_52)/(100−90)}×(95−90)+I_52) for a case in which the set welding current value is 300 A and the set welding voltage value is 95%. In this case, for example, when I_52 is 290 A and I_53 is 300 A, the first interpolation current value is 295 A.

Next, the reference-current interpolation means calculates a second interpolation current value (={(I_43−I_42)/(100−90)}×(95−90)+I_42) for a case in which the set welding current value is 250 A and the set welding voltage value is 95%. In this case, for example, when I_42 is 240 A and I_43 is 250 A, the second interpolation current value is 245 A.

Then, the reference-current interpolation means calculates a reference current value (={(first interpolation current−second interpolation current value)/(300−250)}×(270−250)+second interpolation current value) for a case in which the set welding current value is 270 A and the set welding voltage value is 90%. In this case, when the first interpolation current value is 295 A and the second interpolation current value is 245 A, as described above, the reference current value is 265 A.

According to the tip-base metal distance control method of the second embodiment, even when the operator does not perform test welding under the same welding condition as that for actual welding, the reference current value can be calculated by interpolation of data collected and held beforehand in test welding. Therefore, even when test welding is performed under the limited condition, the tip-base metal distance Lw in actual welding can be controlled to be fixed.

Next, a detailed description will be given of a tip-base metal distance control method according to a third embodiment using the above-described arc welding system 100.

The tip-base metal distance control method of the third embodiment is similar to the above-described first embodiment in including an actual-welding-current pre-acquisition step, a reference-current storage-table generation step, an actual-welding-current acquisition step, a reference-current acquisition step, a current comparison step, and a welding-torch-position correction step.

However, in the actual-welding-current pre-acquisition step of the third embodiment, when actual welding current values are measured under a plurality of test welding conditions while changing the test welding condition in order to calculate an average actual welding current value in test welding and when the average-value calculation means 41a of the arc welding system 100 determines that the range of variations in the actual welding current values corresponding to the test welding conditions exceeds a predetermined threshold value, an error-flag generating means (not illustrated) of the arc welding system 100 considers the average actual welding current value in test welding to be an error and sets an error flag. For example, the indication of the variations in the actual welding current values is the difference between the maximum actual welding current value and the minimum actual welding current value.

This is because, when the range of variations in the actual welding current values measured in test welding exceeds the predetermined threshold value, the average actual welding current value in test welding is sometimes unstable. The predetermined threshold value refers to the range of variations in the actual welding current values that may hinder calculation of a stable average actual welding current value. Usually, the operator obtains the predetermined threshold value by performing welding under predetermined welding conditions according to the experimental rule.

In the third embodiment, when the error-flag generating means sets the error flag, as described above, the reference-current storage-table generating means 42b stores an error flag (ERR) set in the actual-welding-current pre-acquisition step and a corresponding test welding condition in a table so as to generate a reference-current storage table in the reference-current storage table generation step, as illustrated in FIG. 6. In FIG. 6, for example, error flags are stored in cells indicating cases in which the set welding voltage value is 80% and the set welding current value is 100 to 200 A, cases in which the set welding voltage value is 90% and the set welding current value is 100 A and 150 A, a case in which the set welding voltage value is 110% and the set welding current value is 500 A, and cases in which the set welding voltage value is 120% and the set welding current value is 450 A and 500 A.

In the third embodiment, when the reference-current acquisition means 42c of the arc welding system 100 recognizes that an error flag is set for the average actual welding current value in test welding set as the reference current value in the reference-current acquisition step, it is determined that copying operation is impossible, and an error output means of the system 100 or 200 performs error output. This is because, when the range of variations in actual welding current values measured in test welding is large, welding itself is unstable, and it may be difficult to perform a stable copying operation, as described above.

In the tip-base metal distance control method of the third embodiment, error output is thus performed when the range of variations in actual welding current values measured in test welding performed by the operator beforehand exceeds the predetermined threshold value. Therefore, the test welding current values calculated in an unstable welding state are eliminated from the reference current values. This allows the tip-base metal distance Lw in actual welding to be controlled more stably.

When the range of variations in actual welding current values measured in test welding exceeds the predetermined threshold value, the operator may be informed of an error and urged to perform remeasurement. This can remove the error during the reference-current storage-table generation step.

Figure 7:
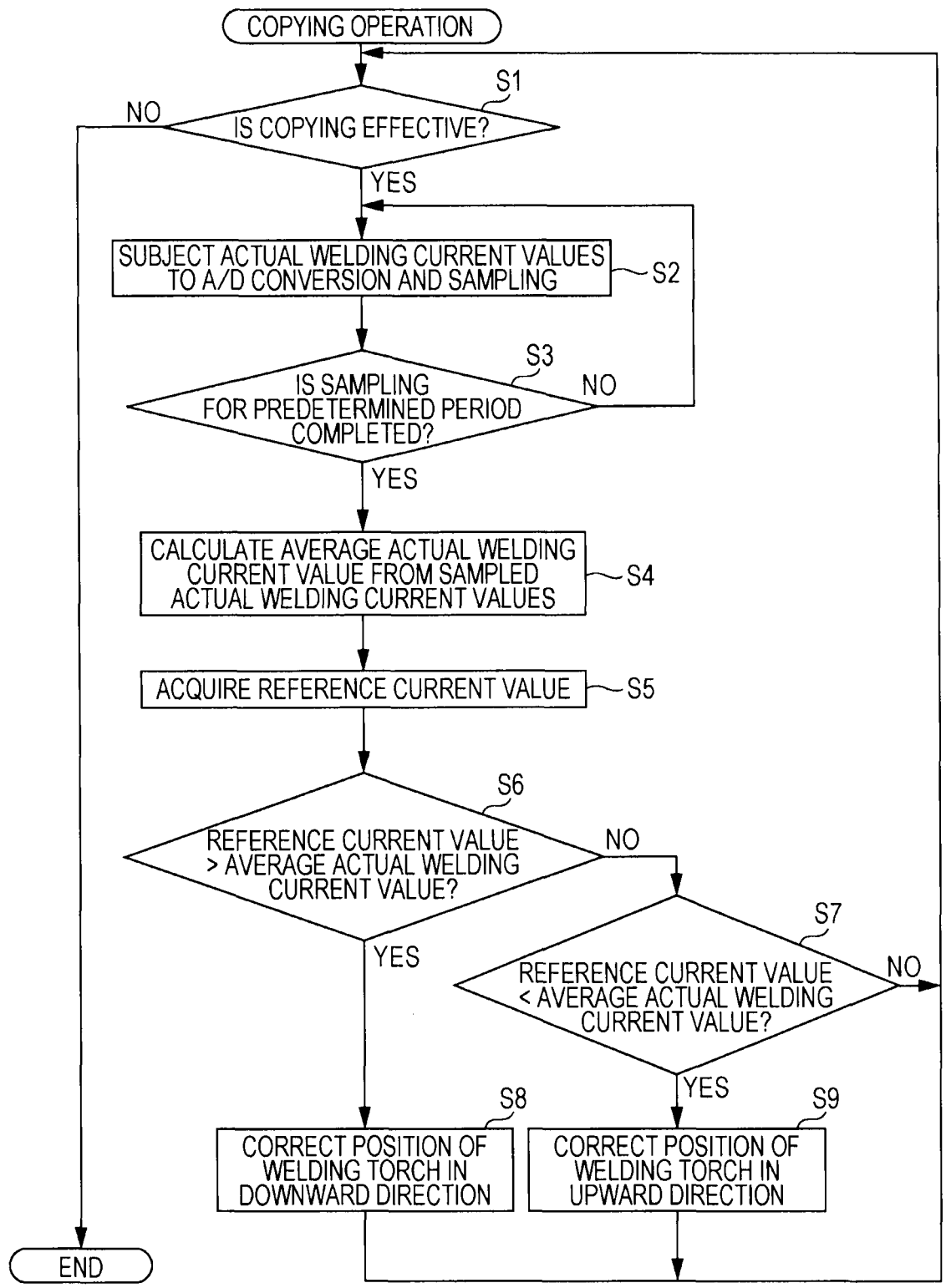
FIG. 7 is a flowchart showing a procedure of the tip-metal base distance control method of the first embodiment.

A detailed description will be given below of the flow of a procedure of the above-described tip-base metal distance control method of the first embodiment with reference to FIG. 7. FIG. 7 indicates a specific flow of the position correction process of the first embodiment, that is, the actual-welding-current acquisition step, the reference-current acquisition step, the current comparison step, and the welding-torch-position correction step. All of the following Steps S1 to S9 are performed by the arc copy control unit 42 of the arc welding system 100.

In a copying operation of the first embodiment, it is first determined in Step S1 whether or not copying of arc welding is effective. When it is determined that copying is effective (Yes in Step S1), in Step S2, actual welding current values detected by the sensor or the like are subjected to A/D conversion and sampling. In contrast, when it is determined that copying is not effective (No in Step S1), the procedure is finished.

Next, in Step S3, it is determined whether or not sampling for a predetermined period is completed. When it is determined that the sampling is completed (Yes in Step S3), an average actual welding current value is calculated from the sampled actual welding current values in Step S4. In contrast, when it is determined that the sampling is not completed (No in Step S3), the procedure returns to Step S2.

Next, in Step S5, a reference current value is acquired by reference to the reference-current storage table. The reference current value is acquired from the reference-current storage table in the above-described process. Next, in Step S6, it is determined by comparison whether or not the reference current value is larger than the average actual welding current value. When the reference current value is larger than the average actual welding current value (Yes in Step S6), the position of the welding torch 10 is corrected in the downward direction to increase the actual welding current value in Step S8, and the procedure returns to Step S1. In contrast, when the reference current value is not larger than the average actual welding current value (No in Step S6), the procedure proceeds to Step S7.

Next, in Step S7, it is determined by comparison whether or not the reference current value is smaller than the average actual welding current value. When the reference current value is smaller than the average actual welding current value (Yes in Step S7), the position of the welding torch 10 is corrected in the upward direction to decrease the actual welding current value in Step S9, and the procedure returns to Step S1. In contrast, when the reference current value is not smaller than the average actual welding current value (No in Step S7), the procedure returns to Step S1.

Figure 8:
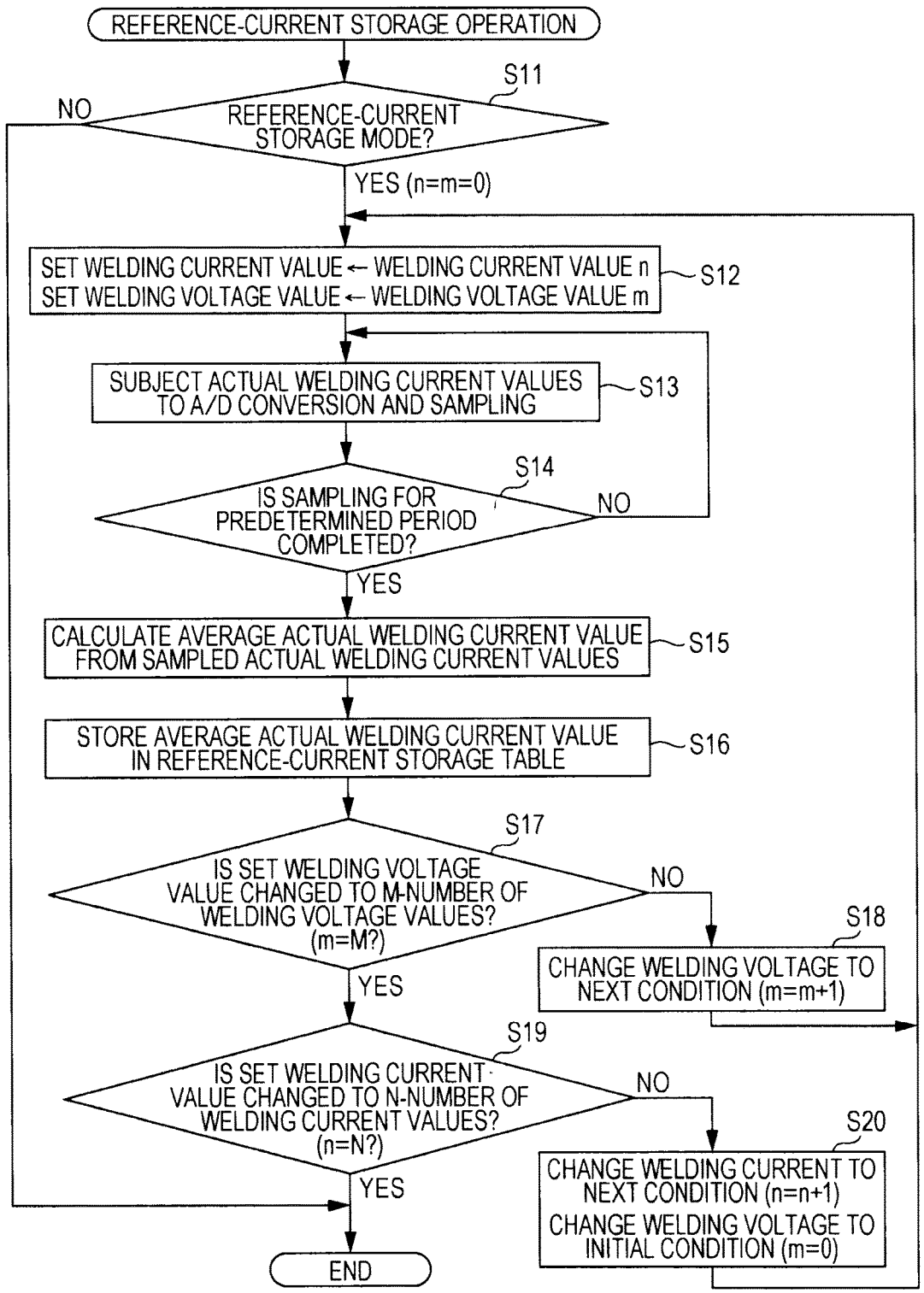
FIG. 8 is a flowchart showing a reference-current storage process in the tip-metal base distance control method of the first embodiment.

A detailed description will be given below of the flow of a reference-current storage operation in the above-described tip-base metal distance control method of the first embodiment with reference to FIG. 8. FIG. 8 indicates a specific flow of the above-described preparation process of the first embodiment, that is, the actual-welding-current pre-acquisition step and the reference-current storage-table generation step. In the following, Steps S11, S12, and S17 to S20 are performed by the operator of arc welding, and Steps S13 to S16 are performed by the arc copy control unit 42 of the arc welding system 100.

In the reference-current storage operation of the first embodiment, it is first determined in Step S11 whether or not the arc welding system 100 is in a reference-current storage mode. When it is determined that the arc welding system 100 is in the reference-current storage mode (Yes in Step S11), in Step S12, arc welding (test welding) is performed while setting the set welding current value to a welding current value n and setting the set welding voltage value to a welding voltage value m. In contrast, when the arc welding system 100 is not in the reference-current storage mode (No in Step S11), the procedure is finished.

Next, in Step S13, actual welding current values detected by the sensor or the like are subjected to A/D conversion and sampling. In Step S14, it is determined whether or not sampling for a predetermined period is completed. When it is determined that the sampling is completed (Yes in Step S14), an average actual welding current value is calculated from the sampled actual welding current values in Step S15. In contrast, when it is determined that the sampling is not completed (No in Step S14), the procedure returns to Step S13.

Next, in Step S16, the average actual welding current value is stored in the reference-current storage table. In Step S17, it is determined whether or not the set welding voltage value is changed to an M-number of welding voltage values. Here, the M-number of welding voltage values refers to the number of predetermined set welding voltage values to be changed in test welding, that is, the number of cells in the row header of the above-described reference-current storage table of FIG. 5. When it is determined in Step S17 that the set welding voltage value is changed to the M-number of welding voltage values (Yes in Step S17), the procedure proceeds to Step S19. In contrast, when it is determined that the set welding voltage value is not changed to the M-number of welding voltage values (No in Step S17), the welding voltage value is changed to the next condition in Step S18, and the procedure returns to Step S12.

Next, in Step S19, it is determined whether or not the set welding current value is changed to an N-number of welding current values. Here, the N-number of welding current values refers to the number of predetermined set welding current values to be changed in test welding, that is, the number of cells in the column header of the above-described reference-current storage table of FIG. 5. When it is determined in Step S19 that the set welding current value is changed to the N-number of welding current values (Yes in Step S19), the procedure is finished. In contrast, when it is determined that the set welding current value is not changed to the N-number of welding current values (No in Step S19), the welding current value is changed to the next condition and the welding voltage value is changed to the initial condition in Step S20, and the procedure returns to Step S12.

Figure 9:
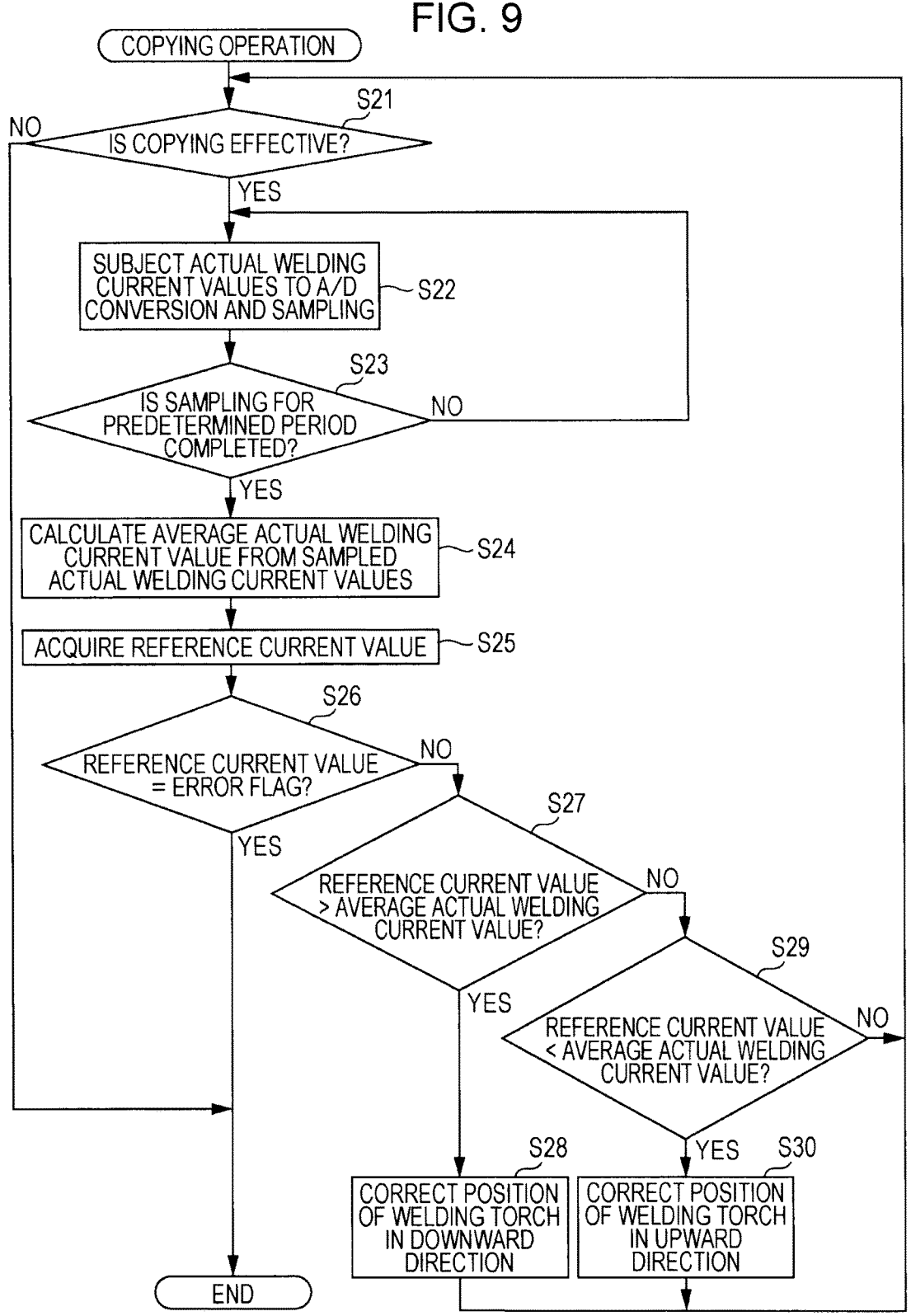
FIG. 9 is a flowchart showing a procedure of the tip-metal base distance control method of the third embodiment.

A detailed description will be given below of the flow of a procedure of the above-described tip-base metal distance control method of the third embodiment with reference to FIG. 9. FIG. 9 indicates a specific flow of the position correction process of the third embodiment, that is, the actual-welding-current acquisition step, the reference-current acquisition step, the current comparison step, and the welding-torch-position correction step. All of the following Steps S1 to S9 are performed by the arc copy control unit 42 of the arc welding system 100.

In a copying operation of the third embodiment, it is first determined in Step S21 whether or not copying of the arc welding system 100 is effective. When it is determined that copying is effective (Yes in Step S21), actual welding current values detected by the sensor or the like are subjected to A/D conversion and sampling in Step S22. In contrast, when it is determined that copying is not effective (No in Step S21), the procedure is finished.

Next, it is determined in Step S23 whether or not sampling for a predetermined period is completed. When it is determined that the sampling is completed (Yes in Step S23), an average actual welding current value is calculated from the sampled actual welding current values in Step S24. In contrast, when it is determined that the sampling is not completed (No in Step S23), the procedure returns to Step S22.

Next, in Step S25, a reference current value is acquired by reference to a reference-current storage table. The reference current value is acquired through the above-described process. Next, in Step S26, it is determined whether or not an error flag is set for the reference current value. When an error flag is set (Yes in Step S26), error output is performed and the procedure is finished. In contrast, when an error flag is not set (No in Step S26), the procedure proceeds to Step S27.

In Step S27, it is determined by comparison whether or not the reference current value is larger than the average actual welding current value. When the reference current value is larger than the average actual welding current value (Yes in Step S27), in Step S28, the position of the welding torch 10 is corrected in the downward direction to increase the actual welding current value, and the procedure returns to Step S21. In contrast, when the reference current value is not larger than the average actual welding current value (No in Step S27), the procedure proceeds to Step S29.

Next, in Step S29, it is determined by comparison whether or not the reference current value is smaller than the average actual welding current value. When the reference current value is smaller than the average actual welding current value (Yes in Step S29), in Step S30, the position of the welding torch 10 is corrected in the upward direction to decrease the actual welding current value, and the procedure returns to Step S21. In contrast, when the reference current value is not smaller than the average actual welding current value (No in Step S29), the procedure returns to Step S21.

A detailed description will be given below of the flow of a reference-current storage operation in the above-described tip-base metal distance control method of the third embodiment with reference to FIG. 10. FIG. 10 indicates a specific flow of the preparation process of the third embodiment, that is, the actual-welding-current pre-acquisition step and the reference-current storage-table generation step. In the following, Steps S31, S32, and S40 to S43 are performed by the operator of arc welding, and Steps S33 to S39 are performed by the arc copy control unit 42 of the arc welding system 100.

In the reference-current storage operation of the third embodiment, it is first determined in Step S31 whether or not the arc welding system 100 is in a reference-current storage mode. When it is determined that the arc welding system 100 is in the reference-current storage mode (Yes in Step S31), in Step S32, arc welding (test welding) is performed while setting the set welding current value to a welding current value n and setting the set welding voltage value to a welding current value m. In contrast, when it is determined that the arc welding system 100 is not in the reference-current storage mode (No in Step S31), the procedure is finished.

Next, in Step S33, actual welding current values detected by the sensor or the like are subjected to A/D conversion and sampling. Then, it is determined in Step S34 whether or not sampling for a predetermined period is completed. When it is determined that the sampling is completed (Yes in Step S34), a standard deviation is calculated from the sampled actual welding current values in Step S35. In contrast, when it is determined that the sampling is not completed (No in Step S34), the procedure returns to Step S33.

Next, in Step S36, it is determined whether or not the standard deviation is larger than an abnormality determining threshold value. When it is determined that the standard deviation is larger than the abnormality determining threshold value (Yes in Step S36), in Step S37, an error flag is stored in the reference-current storage table, as illustrated in FIG. 6. In contrast, when it is determined that the standard deviation is smaller than or equal to the abnormality determining threshold value (No in Step S36), an average actual welding current value is calculated from the sampled actual welding current values in Step S38, and the procedure proceeds to Step S39. The abnormality determining threshold value refers to a range of variations in the actual welding current values that may hinder calculation of the average actual welding current value, and is obtained by the operator beforehand according to the experimental rule. Then, the average actual welding current value is stored in the reference-current storage table in Step S39, and the procedure proceeds to Step S40.

Next, it is determined in Step S40 whether or not the set welding voltage value is changed to an M-number of welding voltage values. When it is determined that the set welding voltage value is changed to the M-number of welding voltage values (Yes in Step S40), the procedure proceeds to Step S42. In contrast, when it is determined that the set welding voltage value is not changed to the M-number of welding voltage values (No in Step S40), the welding voltage value is changed to the next condition in Step S41, and the procedure returns to Step S32.

Next, in Step S42, it is determined whether or not the set welding current value is changed to an N-number of welding current values. When it is determined that the set welding current value is changed to the N-number of welding current values (Yes in Step S42), the procedure is finished. In contrast, when it is determined that the set welding current value is not changed to the N-number of welding current values (No in Step S42), the welding current value is changed to the next condition and the welding voltage value is changed to the initial condition in Step S43, and the procedure returns to Step S32.

A description will be given of an example of a tandem arc welding system that carries out the tip-base metal distance control method of the embodiment with reference to FIGS. 2B and 4.

A tandem arc welding system 200 conducts arc welding on a weld line of a base metal M while correcting the position of a welding torch 10 having two wires W in the upward direction or the downward direction or weaving the welding torch 10 in the right-left direction. As illustrated in FIG. 2B, the tandem arc welding system 200 is similar in structure to the above-described single arc welding system 100 except in including two wire feeding motors 20, two welding-current conversion units 41 in a robot controller 40, two welding power sources 50, and two welding-current detection units 51 in correspondence to the two wires W. Therefore, structures similar to those adopted in the single arc welding system 100 are denoted by the same reference numerals, and descriptions thereof are omitted.

Figure 2B:
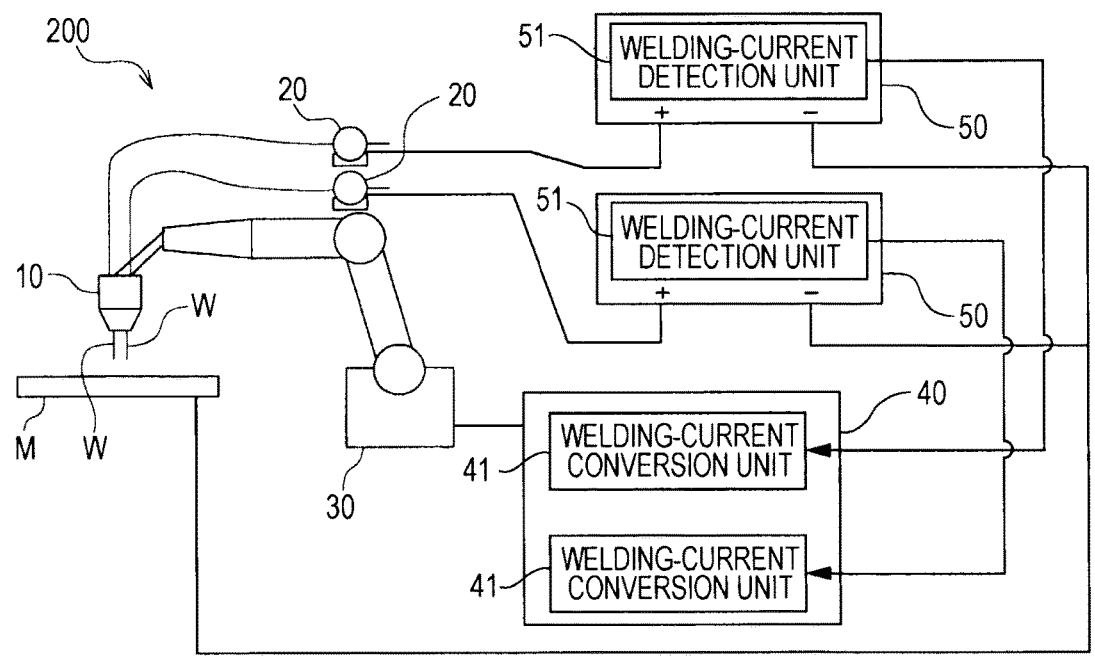

As illustrated in FIG. 2B, the tandem arc welding system 200 simultaneously conducts welding on the base metal M with two wires W. The welding torch 10 provided in the tandem arc welding system 200 supplies the two wires W so that the wires W are parallel to the weld line of the base metal M and one of the wires W precedes the other wire W.

A preceding one of the two wires W supplied to the base metal M by the welding torch 10 is referred to as a preceding wire, and a wire W following the preceding wire is referred to as a following wire. However, the preceding wire and the following wire indicate the roles of the two wires W, and are not fixed physically. Therefore, for example, when welding proceeds in the rightward direction in FIG. 2B, the right wire W serves as a preceding wire and the left wire W serves as a following wire. When welding proceeds in the leftward direction in FIG. 2B, the relation is reversed.

A detailed description will be given below of the flow of a control operation for a tip-base metal distance Lw in an arc copy control unit 42 of the tandem arc welding system 200.

First, in a preparation process for generating a reference-current storage table, reference-current storage tables are sequentially generated in correspondence with the two wires W. For example, when the left wire W in FIG. 2B is a preceding wire and test welding is performed under a predetermined welding condition, the upper welding-current detection unit 51 detects analog data on actual welding current values of the preceding wire W at predetermined sampling intervals, and outputs the analog data to the upper welding-current conversion unit 41. In this case, arc welding is performed only with the preceding wire without emitting an arc from the following wire.

Next, as illustrated in FIG. 4, the welding-current conversion unit 41 subjects the actual welding current values of the preceding wire to A/D conversion, and outputs the converted actual welding current values to an average-value calculation means 41a of the arc copy control unit 42. A teaching means (teaching unit) 43 of the robot controller 40 outputs test welding conditions of the preceding wire corresponding to the actual welding current values to a reference-current storage-table generating means 42b. The teaching means 43 also informs the reference-current storage-table generating means 42b that the preceding wire is the left wire W in FIG. 2B.

Next, as illustrated in FIG. 4, the average-value calculation means 41a calculates an average actual welding current value from the actual welding current values of the preceding wire, and outputs the average actual welding current value to the reference-current storage-table generating means 42b. Then, the reference-current storage-table generating means 42b stores the test welding conditions of the preceding wire and the average actual welding current value in test welding in a table so as to generate a reference-current storage table for the left wire W in FIG. 2B. Also, the reference-current storage-table generating means 42b stores the reference-current storage table in a memory means 42f.

Next, the preceding wire is switched to the right wire W in FIG. 2B, an operation similar to the above is performed, and a reference-current storage table for the right wire W is generated and stored in the memory means 42f. In this case, the teaching means 43 informs the reference-current storage-table generating means 42b that the preceding wire is the right wire W in FIG. 2B.

Next, in a position correction process for correcting the position of the welding torch 10, when the operator performs actual welding under a predetermined actual welding condition, the welding-current detection unit 51 that supplies power to the preceding wire detects analog data on actual welding current values of the preceding wire, and outputs the analog data to the welding-current conversion unit 41. Then, as illustrated in FIG. 4, the welding-current conversion unit 41 subjects the input actual welding current values of the preceding wire to A/D conversion, and outputs the converted actual welding current values to the average-value calculation means 41a of the arc copy control unit 42. Further, the teaching means (teaching unit) 43 of the robot controller 40 outputs, to the memory means 42f, test welding conditions for the preceding wire corresponding to the actual welding current values.

Next, the average-value calculation means 42a calculates an average actual welding current value from the input actual welding current values of the preceding wire, and outputs the average actual welding current value in actual welding to a current comparison means 42d. A reference-current acquisition means 42c checks the actual welding condition for the preceding wire stored in the memory means 42f with the reference-current storage table for the preceding wire, and determines whether or not the reference-current storage table includes a test welding condition that coincides with the actual welding condition. When the reference-current storage table includes a test welding condition that coincides with the actual welding condition for the preceding wire, the reference-current acquisition means 42c extracts the average actual welding current value corresponding to the test welding condition from the reference-current storage table, and sets the average actual welding current value as a reference current value. Then, the reference-current acquisition means 42c outputs the reference current value to the current comparison means 42d.

Next, the current comparison means 42d compares the input average actual welding current value of the preceding wire in actual welding with the reference current value, and outputs the comparison result to a welding-torch-position correction means 42e. According to the comparison result, the welding-torch-position correction means 42e generates a copy correction amount for correcting the position of the welding torch 10 in the upward direction or the downward direction, and outputs the copy correction amount to a robot-trajectory planning unit 44. As will be described below, the robot-trajectory planning unit 44 commands a welding robot 30 to correct the position of the welding torch 10 on the basis of the input copy correction amount.

In this way, in the tandem arc welding system 200, a reference-current storage table for each of the two wires W in test welding is generated and held as data beforehand. In actual welding, the tip-base metal distance Lw can be controlled to be fixed by checking the actual welding condition of the preceding wire in actual welding with the reference-current storage table for the preceding wire. Therefore, even when arc welding is conducted on the base metal M by supplying two wires W, that is, the preceding wire and the following wire, the tandem arc welding system 200 having the above configuration can properly control the tip-base metal distance Lw.

The arc copy control unit 42 in the tandem arc welding system 200 may include a reference-current interpolation means, a parameter correction means, an error-flag generating means, and an error output means in addition to the above means, in a manner similar to that adopted in the single arc welding system 100.

Examples

With reference to FIGS. 11 and 12, examples of tip-base metal distance control methods of the present invention will be described in contrast to a comparative example that does not meet the requirements of the present invention. In these examples, a single arc welding system is used, and the reference current value is 280 A when the set welding current value is 300 A and the set welding voltage value is 28 V. For convenience, in FIGS. 10 and 11, SC represents the set welding current value, TC represents the actual welding current value, and SV represents the set welding voltage value.

Figure 11A:
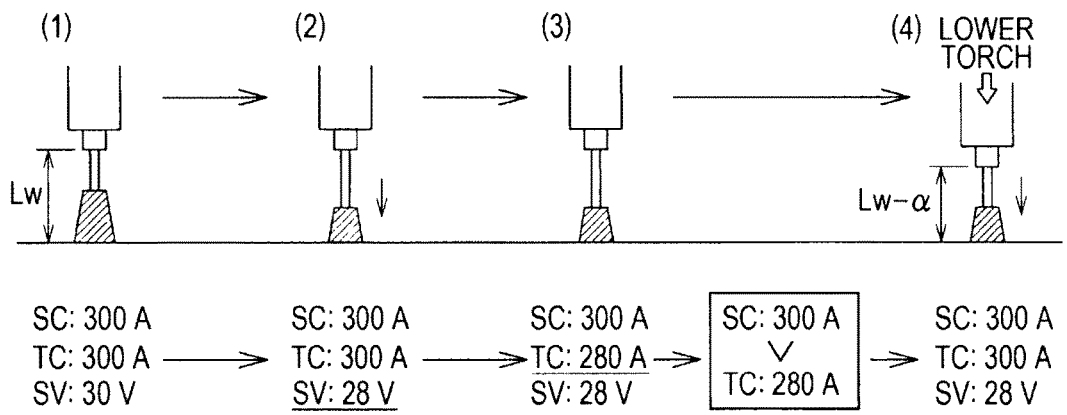
FIGS. 11A and 11B schematically illustrate examples of tip-base metal distance control methods.

First, a tip-base metal distance control method according to the comparative example that does not meet the requirements of the present invention will be described with reference to FIG. 11A. In FIG. 11A(1), the set welding current value (SC) is 300 A, the set welding voltage value (SV) is 30 V, and the actual welding current value (TC) is 300 A. Therefore, the set welding current value (SC) coincides with the actual welding current value (TC), so that a welding state is stable. In contrast, when the set welding voltage value (SV) decreases to 28 V, as illustrated in FIG.

11A(2), the arc length decreases. Then, as illustrated in FIG. 11A(3), the resistance of a wire extending portion increases with the decrease in arc length, and the actual welding current value (TC) decreases from 300 A to 280 A. Then, since the actual welding current value (TC) is smaller than the set welding current value (SC), as shown in a box, control is performed so that the welding torch is lowered to decrease the resistance of the wire extending portion and to return the actual welding current value (TC) to 300 A. Thus, in the tip-base metal distance control method using the copying operation of the related art, the tip-base metal distance Lw decreases to Lw-α, and is not controlled to be fixed.

Figure 11B:
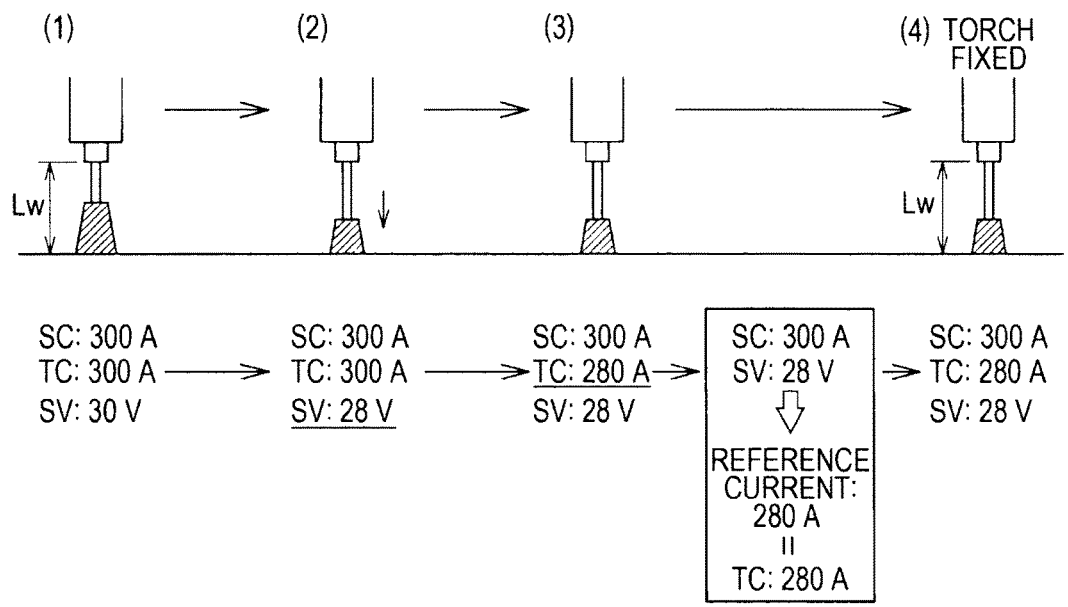
Figure 13:
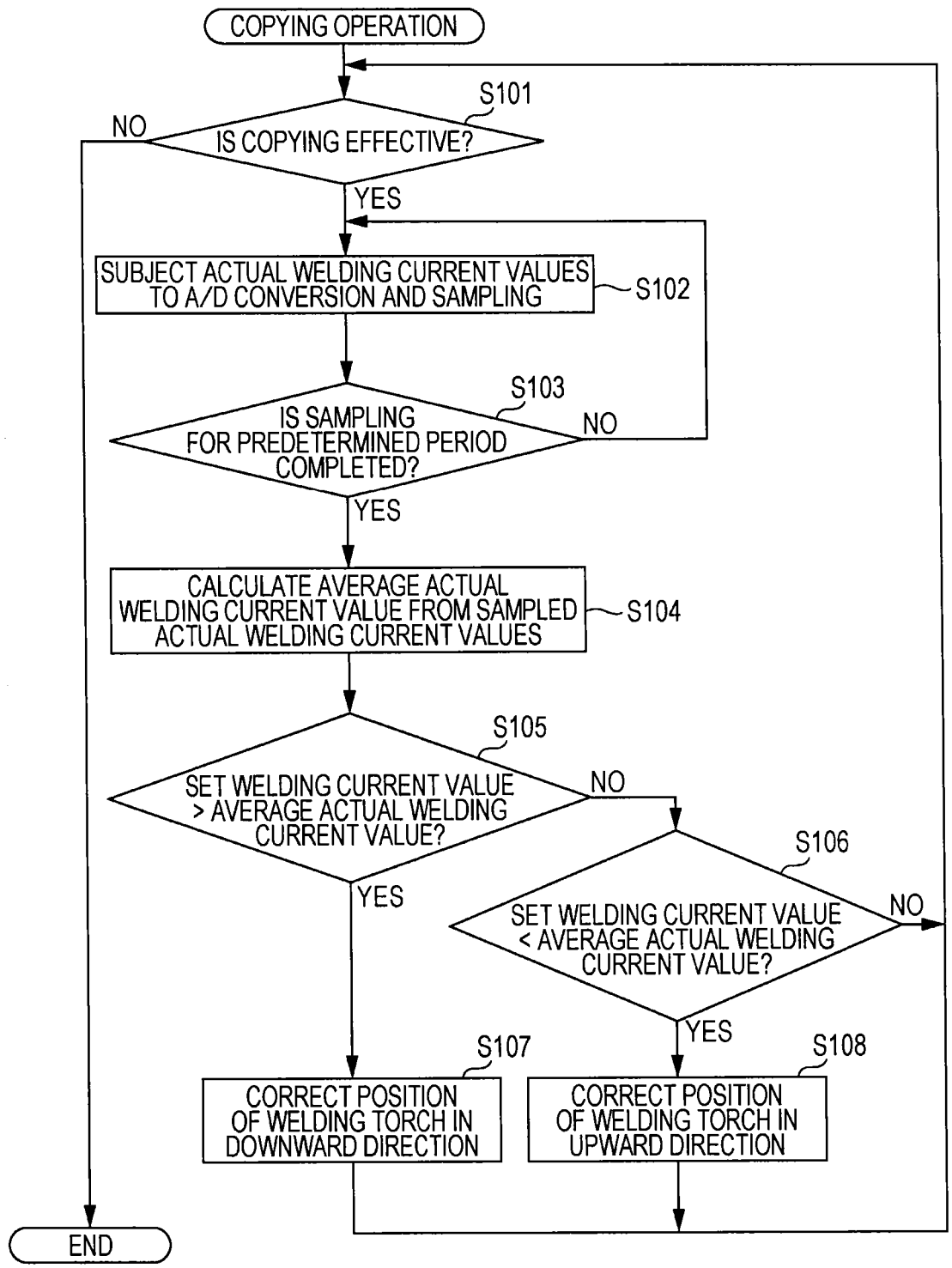
FIG. 13 is a flowchart showing a procedure of a tip-base metal distance control method of the related art.

Next, a description will be given of a tip-base metal distance control method according to a first example that meets the requirements of the present invention with reference to FIG. 11B. FIGS. 11B(1) to 11B(3) are similar to FIGS. 11A(1) to 11A(3). In the first example, a reference current value provided when the set welding current value (SC) is 300 A and the set welding voltage value (SV) is 28 V is compared with the actual welding current value (TC), as shown in a box. Since the reference current value and the actual welding current value (TC) are both 280 A, the position of the welding torch is not corrected, as illustrated in FIG. 11B(4). Therefore, the tip-base metal distance control method of the first example can control the tip-base metal distance to be fixed.

Next, a description will be given of a tip-base metal distance control method according to a second example that meets the requirements of the present invention with reference to FIG. 12A. In the second example, the weld line descends, as illustrated in FIG. 12A. FIGS. 12A(1) and 12A(2) are similar to FIGS. 11A(1) and 11A(2). In the second example, as illustrated in FIG. 12A(3), the actual welding current value (TC) decreases with the decrease in arc length, and the resistance of a wire extending portion is rapidly increased by the increase in extension length Lx due to the descent of the weld line. Hence, the actual welding current value (TC) rapidly decreases from 300 A to 270 A. Then, the actual welding current value (TC) is smaller than the reference current value, as shown in a box, and therefore, control is performed so that the welding torch is lowered to decrease the resistance of the wire extending portion and to increase the actual welding current value (TC) to 280 A. Therefore, the tip-base metal distance control method of the second example can control the tip-base metal distance to be fixed.

Next, a description will be given of a tip-base metal distance control method according to a third example that meets the requirements of the present invention with reference to FIG. 12B. In the third example, the weld line ascends, as illustrated in FIG. 12B. FIGS. 12B(1) and 12B(2) are similar to FIGS. 11A(1) and 11A(2). While the actual welding current value (TC) decreases with the decrease in arc length in the third example, as illustrated in FIG. 12B(3), the resistance of a wire extending portion is decreased by the decrease in extension length Lx due to the ascent of the weld line. Hence, the actual welding current value (TC) slightly decreases from 300 A to 290 A. Then, since the actual welding current value (TC) is larger than the reference current value, as shown in a box, control is performed so that the welding torch is raised to increase the resistance of the wire extending portion and to decrease the actual welding current value (TC) to 280 A, as illustrated in FIG. 12B(4). Therefore, the tip-base metal distance control method of the third example can control the tip-base metal distance to be fixed.

In this way, according to the tip-base metal distance control method for arc welding of the present invention, even when the set welding voltage value is changed or the devices have errors, the position of the welding torch is corrected so that the actual welding current value is closer to the constantly stable reference current value. For this reason, it is possible to maintain a fixed tip-base metal distance during welding and to achieve stable arc welding.

What is claimed is:
1. A tip-base metal distance control method for an arc welding system, the method comprising:
 (i) measuring actual welding current values under a predetermined actual welding condition, and calculating an average actual welding current value under the actual welding condition to obtain a calculated average actual welding current value;
 (ii) extracting, from a reference-current storage table, a stored average welding current value under a stored welding condition corresponding to the actual welding condition to obtain an extracted average welding current value, and setting the extracted average welding current value as a reference current value;
 (iii) comparing the calculated average actual welding current value with the reference current value to obtain a comparison result; and
 (iv) correcting a position of a welding torch in arc welding in an upward or a downward direction based on the comparison result so as to maintain a fixed distance between a tip at an end of the welding torch and a base metal.

2. The method according to claim 1, wherein in (ii), in the absence of the stored welding condition corresponding to the actual welding condition,
 a weld condition corresponding to the actual welding condition is calculated by interpolation based on stored welding conditions in the reference-current storage table, and
 the reference current value is set as a welding current value calculated by interpolation based on stored average welding current values.

3. The method according to claim 1, further comprising, prior to (i):
 (v) measuring welding current values under a predetermined test welding condition and calculating an average welding current value under the test welding condition; and
 (vi) storing the average welding current value under the test welding condition and the corresponding test welding condition in a table so as to generate the reference-current storage table.

4. The method according to claim 3, wherein the arc welding is performed by bead welding for a flat plate or fillet welding in (v).

5. The method according to claim 3, wherein, when a test welding in (v) and an actual welding in (i) are performed by different methods, the reference current value in (ii) is corrected by using a parameter obtained beforehand.

6. The method according to claim 3, wherein, in (v), when welding current values are measured under a plurality of changing test welding conditions a range of variations in the welding current values in calculating average welding current values is determined to exceed a predetermined threshold value, the average welding current values under the changing test welding conditions are regarded as errors.

7. The method according to claim 3, wherein
the actual welding current values in (i) are measured when a predetermined time elapses from start or change of the actual welding condition, and
the welding current values in (v) are measured when the predetermined time elapses from start or change of the test welding condition.

8. A single arc welding system, comprising:
a welding torch that supplies a wire to a base metal; and
an arc copying unit that controls a copying operation of the welding torch,
wherein
the single arc welding system corrects a position of the welding torch based on a reference-current storage table that stores predetermined welding conditions and corresponding average welding current values under the predetermined welding conditions, and
the arc copying unit
calculates an average actual welding current value under an actual welding condition,
extracts, from the reference-current storage table, an extracted average welding current value corresponding to the actual welding condition and sets the extracted average welding current value as a reference current value,
compares the average welding current value with the reference current value to obtain a comparison result, and
corrects the position of the welding torch in an upward or a downward direction based on the comparison result so as to maintain a fixed distance between a tip at an end of the welding torch and the base metal.

9. A tandem arc welding system, comprising:
a welding torch that supplies two wires comprising a preceding wire and a following wire to a base metal; and
an arc copying unit that controls a copying operation of the welding torch,
wherein
the tandem arc welding system corrects a position of the welding torch based on a reference-current storage table for each of the two wires in which predetermined welding conditions and corresponding average welding current values under the predetermined welding conditions are stored, and
the arc copying unit
calculates an average welding current value of the preceding wire under an actual welding condition,
extracts, from the reference-current storage table for the preceding wire, an extracted average welding current value corresponding to the welding condition and sets the extracted average welding current value as a reference current value,
compares the average welding current value under the welding condition with the reference current value to obtain a comparison result, and
corrects the position of the welding torch in an upward or a downward direction based on the comparing result so as to maintain a fixed distance between a tip at an end of the welding torch and the base metal.

* * * * *